United States Patent
Watanabe et al.

(10) Patent No.: US 8,982,844 B2
(45) Date of Patent: Mar. 17, 2015

(54) BASE STATION, COMMUNICATION METHOD AND WIRELESS COMMUNICATION SYSTEM

(75) Inventors: Satoshi Watanabe, Yokohama (JP); Bun Kimura, Yokohama (JP); Tetsuo Tomita, Yokohama (JP); Masanori Hashimoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 336 days.

(21) Appl. No.: 13/471,655

(22) Filed: May 15, 2012

(65) Prior Publication Data

US 2013/0022025 A1   Jan. 24, 2013

(30) Foreign Application Priority Data

Jul. 19, 2011 (JP) ................................. 2011-158274

(51) Int. Cl.
| | |
|---|---|
| H04W 4/00 | (2009.01) |
| H04L 12/26 | (2006.01) |
| H04W 36/30 | (2009.01) |
| H04W 36/00 | (2009.01) |
| H04W 84/04 | (2009.01) |

(52) U.S. Cl.
CPC .......... *H04W 36/30* (2013.01); *H04W 36/0055* (2013.01); *H04W 84/047* (2013.01)
USPC .......................................... 370/332; 370/252

(58) Field of Classification Search
USPC ......... 370/252, 254, 255, 328, 329, 331, 332, 370/330
See application file for complete search history.

(56) References Cited

U.S. PATENT DOCUMENTS

| | | | |
|---|---|---|---|
| 7,848,758 B1 * | 12/2010 | Sill et al. ..................... | 455/452.1 |
| 2008/0171553 A1 * | 7/2008 | Ren et al. ...................... | 455/450 |
| 2010/0046396 A1 * | 2/2010 | Cai et al. ........................ | 370/254 |
| 2011/0159874 A1 | 6/2011 | Ninagawa | |
| 2011/0211521 A1 | 9/2011 | Baba et al. | |

FOREIGN PATENT DOCUMENTS

| | | |
|---|---|---|
| JP | 2010-056857 | 3/2010 |
| JP | 2010-056934 | 3/2010 |
| JP | 2010-259020 | 11/2010 |

OTHER PUBLICATIONS

3GPP TS 36.300 V10.3.0 (Mar. 2011), Technical Specification Group Radio Access Network; "4.7 Support for relaying".

\* cited by examiner

*Primary Examiner* — Hoon J Chung
*Assistant Examiner* — Feben M Haile
(74) *Attorney, Agent, or Firm* — Fujitsu Patent Center

(57) ABSTRACT

A base station, to which a cell belongs and which communicates with a relay node to which a relay node cell belongs, including a control unit configured, at a time of handing over the relay node from another cell belonging to a first base station to the cell belonging to the base station, to request the relay node to measure wireless quality of neighbor cells of the cell belonging to the base station and report a measurement result of the wireless quality, and to update by adding or deleting, if the measurement result of the wireless quality of a first neighbor cell among the neighbor cells is higher or lower than a predetermined threshold for the cell existing at the handover destination of the relay node, the relay node cell to or from a first neighbor cell list of the first neighbor cell, respectively.

15 Claims, 25 Drawing Sheets

FIG.7

| IE/Group Name | Presence | Semantics description |
|---|---|---|
| Message Type | M | A MESSAGE TYPE FOR IDENTIFYING A MESSAGE. |
| Handover Relay ID | M | AN IDENTIFICATION ID OF A RELAY NODE TRIGGERING THIS MESSAGE AND HAVING BEEN HANDED OVER PREVIOUSLY. |
| Direction | M | INDICATING WHETHER A SENDING DIRECTION IS FROM SOURCE TO TARGET OR FROM TARGET TO SOURCE. |
| Neighbour cell number | M | HEREINAFTER, THE NEIGHBOUR CELL LIST. THE NUMBER OF CELLS (INFORMATION PIECE) TO BE ADDED TO THE NEIGHBOUR CELL LIST. |
| >Neighbour Information | | NEIGHBOUR CELL INFORMATION (1 PIECE) |
| >>ECGI | M | E-UTRAN CELL GLOBAL ID OF NEIGHBOUR CELL |
| >>PCI | M | PHYSICAL CELL ID OF NEIGHBOUR CELL |
| >>EARFCN | M | DL EARFCN for FDD |

FIG.8

| IE/Group Name | Presence | Semantics description |
|---|---|---|
| Message Type | M | A MESSAGE TYPE FOR DISTINGUISHING A MESSAGE. |
| Handover Relay ID | M | AN IDENTIFICATION ID OF A RELAY NODE TRIGGERING THIS MESSAGE AND HAVING BEEN HANDED OVER PREVIOUSLY. |
| Delete Neighbour cell number | M | INDICATING THE NUMBER OF CELLS TO BE DELETED (IN CASE OF NO DELETION, 0) |
| >Neighbour Information | | NEIGHBOUR CELL INFORMATION (1 PIECE) TO BE DELETED |
| >>ECGI | M | E-UTRAN CELL GLOBAL ID OF NEIGHBOUR CELL |
| >>PCI | M | PHYSICAL CELL ID OF NEIGHBOUR CELL |
| >>EARFCN | M | DL EARFCN for FDD |

FIG.9

| IE/Group Name | Presence | Semantics description |
|---|---|---|
| Message Type | M | A MESSAGE TYPE FOR IDENTIFYING A MESSAGE. |
| Handover Relay ID | M | AN IDENTIFICATION ID OF A RELAY NODE TRIGGERING THIS MESSAGE AND HAVING BEEN HANDED OVER PREVIOUSLY. |
| Add Neighbour cell number | M | INDICATING THE NUMBER OF CELLS TO BE ADDED (IN CASE OF NO ADDITION, 0) |
| >Neighbour Information | | NEIGHBOUR CELL INFORMATION (1 PIECE) TO BE ADDED |
| >>ECGI | M | E-UTRAN CELL GLOBAL ID OF NEIGHBOUR CELL |
| >>PCI | M | PHYSICAL CELL ID OF NEIGHBOUR CELL |
| >>EARFCN | M | DL EARFCN for FDD |

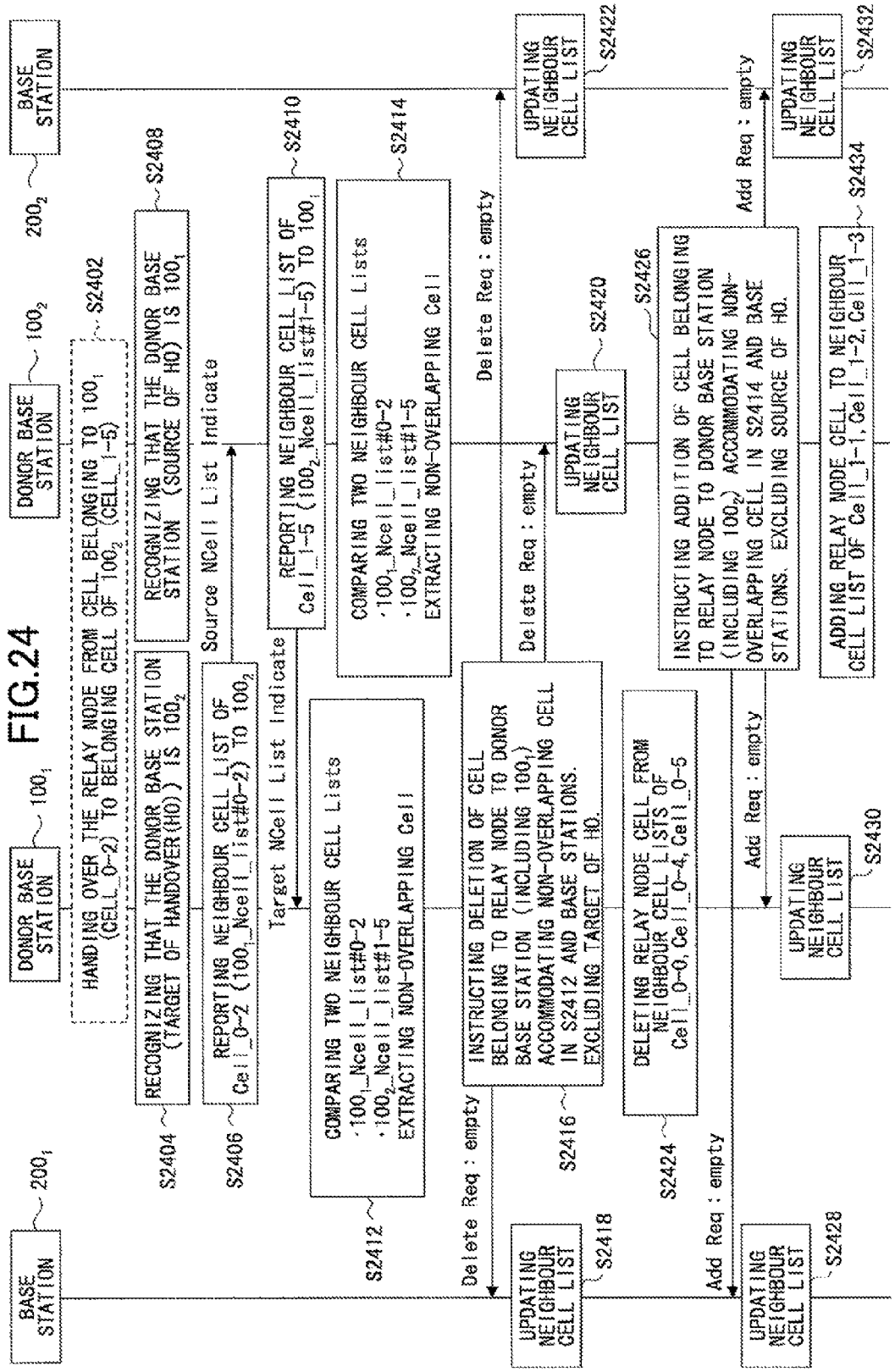

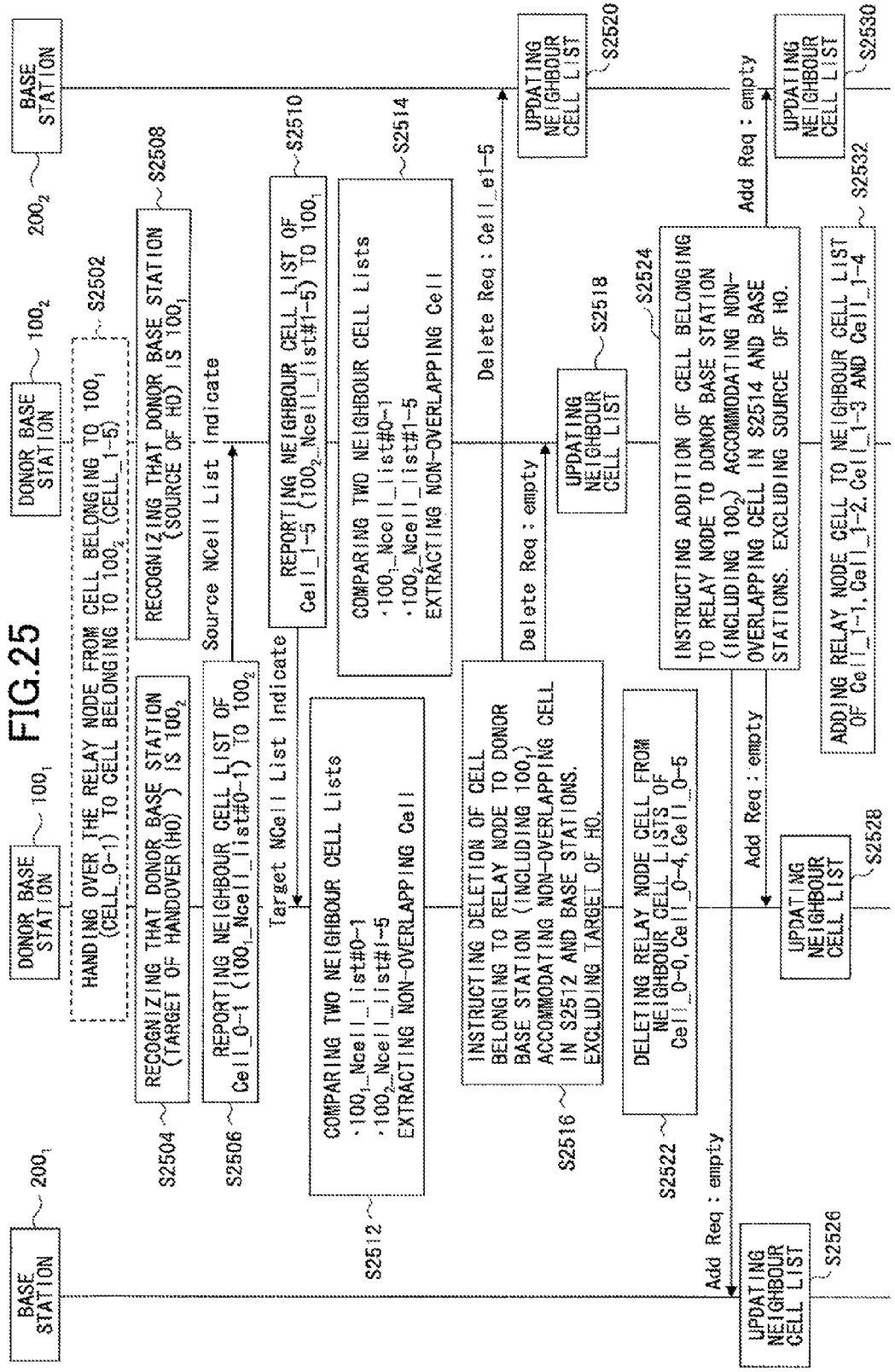

BASE STATION, COMMUNICATION METHOD AND WIRELESS COMMUNICATION SYSTEM

CROSS-REFERENCE TO RELATED APPLICATIONS

This patent application is based upon and claims the benefit of priority of the prior Japanese Patent Application No. 2011-158274 filed on Jul. 19, 2011, the entire contents of which are incorporated herein by reference.

FIELD

The embodiments discussed herein are related to a wireless communication system.

BACKGROUND

As disclosed in "4.7 Support for relaying" 3GPP TS36.300, V10.3.0, 2011-03, in 3rd Generation Partnership Project (3GPP), a Relay Node (RN) is being studied for the purpose of improving the coverage of a network (hereinafter, referred to as a LTE network) performing wireless communication in conformity with Long Term Evolution (LTE) and expanding the capacity of the LTE network.

The relay node relays a communication with a wireless interface between a base station (eNode, hereinafter eNB) which performs wireless communications in conformity with LTE and a mobile terminal (User Equipment or UE, hereinafter referred to as a user terminal) corresponding to LTE.

The following is known about the relay node (see "4.7 Support for relaying" 3GPP TS36.300, V10.3.0, 2011-03, in 3rd Generation Partnership Project (3GPP)).

The relay node is connected to the network by a donor base station (Donor eNB: DeNB). The donor base station has an additional function of communicating while considering the relay nodes.

The relay node includes one cell. The one cell is independent from a cell included in the donor base station. The relay node terminates a Radio Resource Control (RRC) protocol so as to independently control the RRC protocol.

The relay node may be used in transportation such as a train and a small-sized area such as an event site. By enabling to utilize the relay node in the transportation and the small-sized area, a region accommodating communications and a capacity of accommodating the communications can be improved. The region of the cell covered by the relay node is narrower than a region of a macrocell belonging to the base station or than a region of a macrocell belonging to the donor station.

SUMMARY

According to an aspect of the embodiment, there is provided a base station, to which a cell belongs and which communicates with a relay node to which a relay node cell belongs, including a control unit configured, at a time of handing over the relay node from another cell belonging to a first base station to the cell belonging to the base station, to request the relay node to measure wireless quality of neighbour cells adjacent to the cell belonging to the base station and report a measurement result of the wireless quality, the cell existing at a handover destination of the relay node; and to update by adding, if the measurement result of the wireless quality of a first neighbour cell among the neighbour cells is the same as or higher than a predetermined threshold for the cell existing at the handover destination of the relay node, the relay node cell to a first neighbour cell list of the first neighbour cell, and to update by deleting, if the measurement result of the wireless quality of a second neighbour cell among the neighbour cells is lower than a predetermined threshold for the cell existing at the handover destination of the relay node, the relay node cell from a second neighbour cell list of the second neighbour cell.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 7 illustrates an exemplary neighbour cell list of the embodiment;
FIG. 8 illustrates first neighbour cell list changing information of the embodiment;
FIG. 9 illustrates second neighbour cell list changing information of the embodiment;
FIG. 24 illustrates a first operation of an exemplary wireless communication system of the embodiment;
and
FIG. 25 illustrates a second operation of the exemplary wireless communication system of the embodiment.

DESCRIPTION OF EMBODIMENTS

A base station or a donor base station holds a list containing information indicative of cells adjacent to each cell belonging to the base station or the donor base station (hereinafter, referred to as a "neighbour cell list"). The user terminal uses a neighbour cell list at a time of the handover.

The neighbour cell list is reported from the base station or the donor station to the user terminal. The user terminal performs a circumjacent cell search based on the neighbour cell list.

Figure 1:
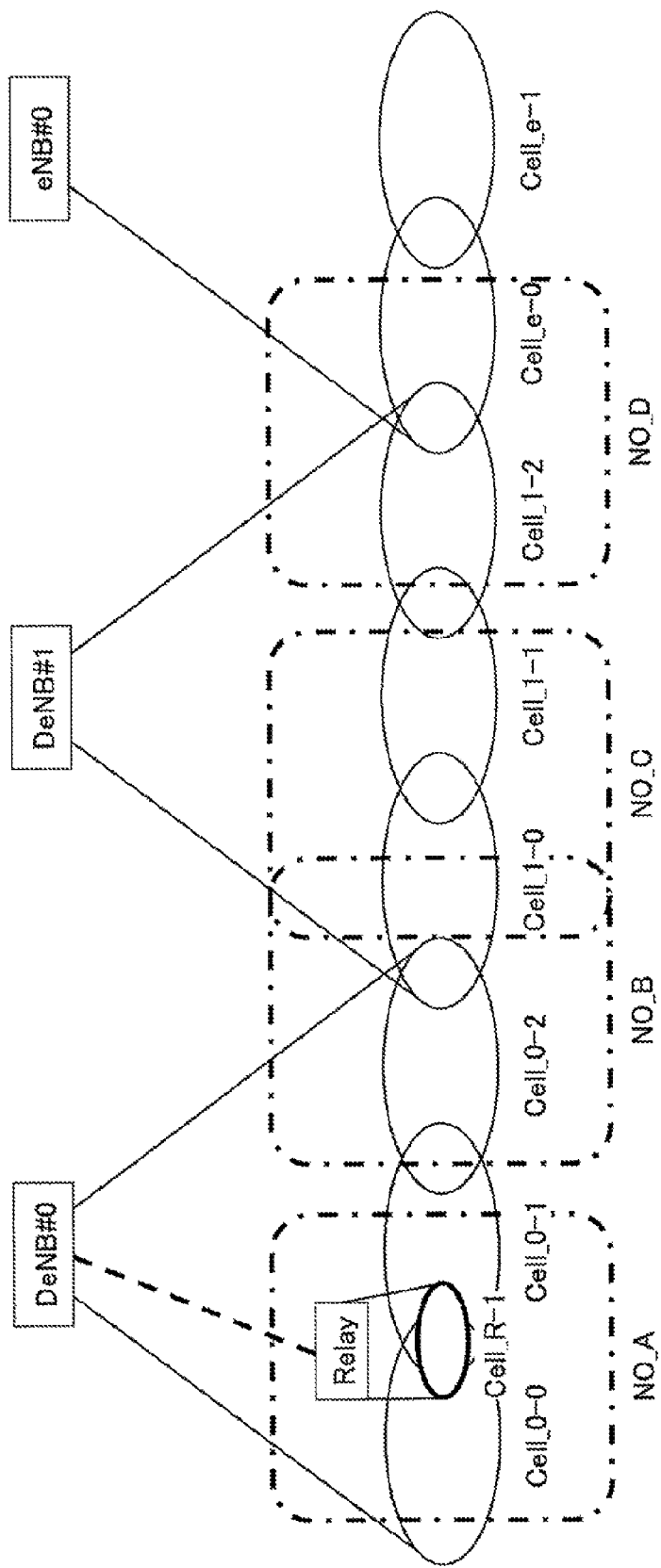
FIG. 1 illustrates an example of neighbour cells.
Figure 2:
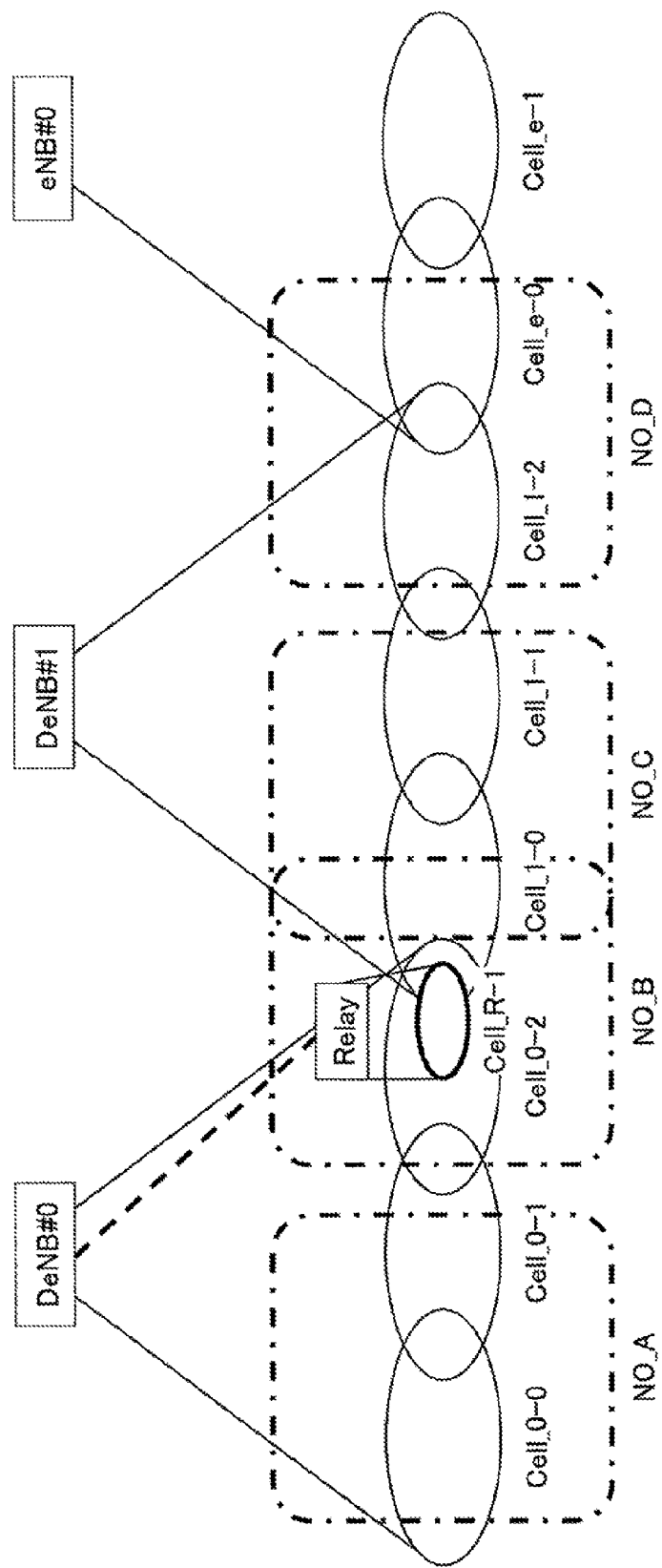
FIG. 2 illustrates another example of neighbour cells.

FIG. 1 and FIG. 2 illustrate an exemplary movement of a relay node.

The donor base station and the base station add information indicative of cells belonging to a relay node to the neighbour cell list. When the relay node moves, the cells belonging to the relay node move along with the movement of the relay node. The donor base station and the base station add the information indicative of the cells belonging to the relay node to the neighbour cell list or delete the information from the neighbour cell list.

Referring to FIG. 1, Cell_R-1 belonging to the relay node covers a region covered by Cell_0-0 belonging to a donor base station DeNB#0 (DeNB#0) and a region at least partly overlapping a region covered by Cell_0-1. Under this state, cells adjacent to Cell_0-0 of the donor base station DeNB #0 include Cell_0-1 and Cell_R-1. Cells adjacent to Cell_0-1 of the donor base station DeNB #0 include Cell_0-0 and Cell_R-1. Cells adjacent to Cell_0-2 of the donor base station DeNB #0 include Cell_0-1 and Cell_1-0.

FIG. 2 illustrates an example in which the state illustrated in FIG. 1 is shifted to a state in which the relay node is moved.

Referring to FIG. 2, Cell_R-1 belonging to the relay node covers a part of a region of Cell_0-2 of the donor base station DeNB#0. Under this state, cells adjacent to Cell_0-0 of the donor base station DeNB #0 include Cell_0-1. This is because, along with the movement of the relay node, information indicative of Cell_R-1 belonging to the relay node is deleted as not being the neighbour cell of Cell_0-0 of the donor base station DeNB#0. Under this state, cells adjacent to Cell_0-1 of the donor base station DeNB #0 include Cell_0-0. This is because, along with the movement of the relay node, information indicative of Cell_R-1 belonging to the relay node is deleted as not being the neighbour cell of Cell_0-1 of the donor base station DeNB#0. Cells adjacent to Cell_0-2 of the donor base station DeNB #0 include Cell_0-1, Cell_1-0 and Cell_R-1. This is because, along with the movement of the relay node, information indicative of Cell_R-1 belonging to the relay node is added to as being the neighbour cell of Cell_0-2 of the donor base station DeNB#0.

Figure 3:
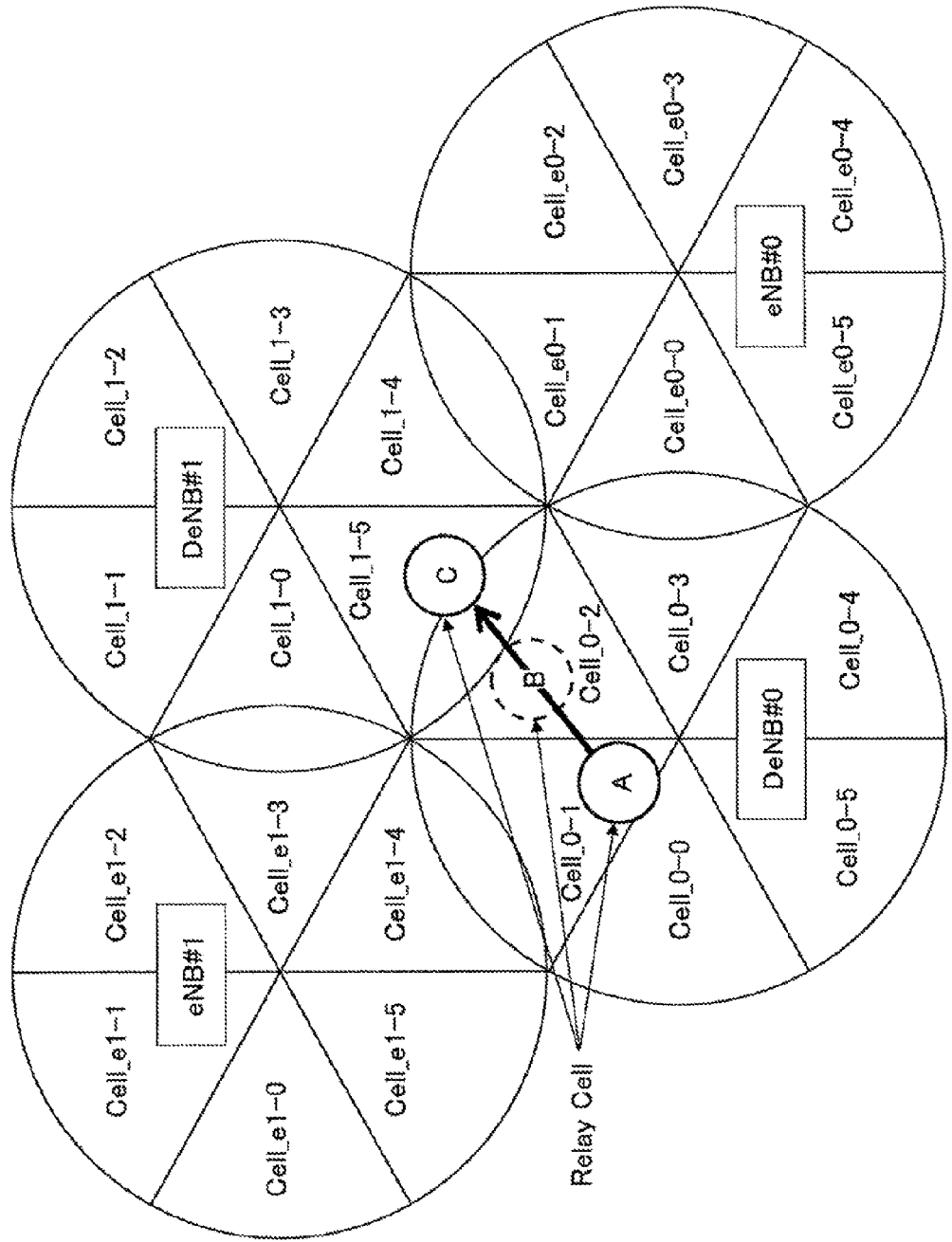
FIG. 3 illustrates an exemplary handover of relay nodes.

FIG. 3 illustrates detailed processes of adding information indicative of the cells belonging to the relay node to the neighbour cell list or deleting the information from the neighbour cell list along with the movement of the relay node.

Referring to FIG. 3, a cell (Relay Cell) belonging to the relay node moves from a part of an end of a region covered by Cell_0-1 belonging to the donor base station DeNB#0 (designated by "A" in FIG. 3) through a part of an end of a region covered by Cell_0-2 belonging to the donor base station DeNB#0 (designated by "B" in FIG. 3) to a part of an end of a region covered by Cell_1-5 belonging to the donor base station DeNB#1 (designated by "C" in FIG. 3). Said differently, the relay node is handed over from Cell_0-1 belonging to the donor base station DeNB#0 to Cell_0-2 belonging to the donor base station DeNB#0, and is further handed over to Cell_1-5 belonging to the donor base station DeNB#1.

When the relay node is connected to Cell_0-1 belonging to the donor base station DeNB#0, cells adjacent to Cell_0-1 register information indicative of Cell_R-1 belonging to the relay node. Specifically, the donor base station DeNB#0 registers information indicative of Cell_R-1 belonging to the relay node as a neighbour cell in Cell_0-0, Cell_0-2, Cell_0-3, Cell_0-4 and Cell_0-5 which belong to the donor base station DeNB#0. Further, a base station eNB#1 registers information indicative of Cell_R-1 belonging to the relay node as a neighbour cell in Cell_e1-3, Cell_e1-4 and Cell_e1-5 which belong to the base station eNB#1.

Described next is a case where the relay node moves to Cell_0-2 of the donor base station DeNB#0. A cell belonging to the relay node is moved to a part of a center of a region covered by Cell_0-2 belonging to the donor base station DeNB#0.

When the relay node is connected to Cell_0-2 belonging to the donor base station DeNB#0, cells adjacent to Cell_0-2 register information indicative of Cell_R-1 belonging to the relay node. Specifically, the donor base station DeNB#0 registers information indicative of Cell_R-1 belonging to the relay node as a neighbour cell in Cell_0-0, Cell_0-1, Cell_0-3, Cell_0-4 and Cell_0-5 which belong to the donor base station DeNB#0. Further, the donor base station DeNB#1 registers information indicative of Cell_R-1 belonging to the relay node as a neighbour cell in Cell_1-0, Cell_1-4 and Cell_1-5 which belong to donor base station DeNB#1. Further, the base station eNB#0 registers information indicative of Cell_R-1 belonging to the relay node as a neighbour cell in Cell_e0-0 and Cell_e0-1 which belong to the base station eNB#0. Further, the base station eNB#1 registers information indicative of Cell_R-1 belonging to the relay node as a neighbour cell in Cell_e1-3 and Cell_e1-4 which belong to the base station eNB#1.

Described next is a case where the relay node moves to Cell_1-5 of the donor base station DeNB#1. A cell belonging to the relay node is moved to a part of a center of a region covered by Cell_1-5 belonging to the donor base station DeNB#1.

When the relay node is connected to Cell_1-5 belonging to the donor base station DeNB#1, cells adjacent to Cell_1-5 register information indicative of Cell_R-1 belonging to the relay node. Specifically, the donor base station DeNB#0 registers information indicative of Cell_R-1 belonging to the relay node as a neighbour cell in Cell_0-1, Cell_0-2 and Cell_0-3 which belong to the donor base station DeNB#0. Specifically, the donor base station DeNB#1 registers information indicative of Cell_R-1 belonging to the relay node as a neighbour cell in Cell_1-0, Cell_1-1, Cell_1-2, Cell_1-3 and Cell_1-4 which belong to the donor base station DeNB#1. Further, the base station eNB#0 registers information indicative of Cell_R-1 belonging to the relay node as a neighbour cell in Cell_e0-0 and Cell_e0-1 which belong to the base station eNB#0. Further, the base station eNB#1 registers information indicative of Cell_R-1 belonging to the relay node as a neighbour cell in Cell_e1-3 and Cell_e1-4 which belong to the base station eNB#1.

It is assumed that the region of the cell belonging to the relay node is narrower than the region of the cells belonging to the donor base station or the base station. Referring to FIG. 3, Cell_R-1 belonging to the relay node may move to "B". In this case, since "B" is a part of a center of the region covered by Cell_0-2 belonging to the donor base station DeNB#0, there is a small probability that the cells belonging to the relay node become the neighbour cell in the cells adjacent to Cell_0-2.

If the cell which belongs to the relay node becomes the neighbour cell with a low probability, a processing load may increase by additional settings of a route for a control signal between the neighbour cells.

Meanwhile, it is not possible to determine by the donor base station and the base station whether the registration as the neighbour cell is performed. Said differently, because an environment for electromagnetic waves may temporally vary, it is difficult for the donor base station and the base station to determine donor base stations and base stations to which a user terminal existing in the cell belonging to the relay node can move. Said differently, because it is assumed that the relay node moves, it is difficult for the donor base station and the base station to determine donor base stations and base stations to which the user terminal existing in the cell belonging to the relay node can move.

A description is given below, with reference to FIG. 1 to FIG. 25 and embodiments of the present invention. Through all figures, the same references symbols are used for portions having the same function and repetitive explanations of these portions are omitted.

First Embodiment

<Wireless Communication System>

Figure 4:
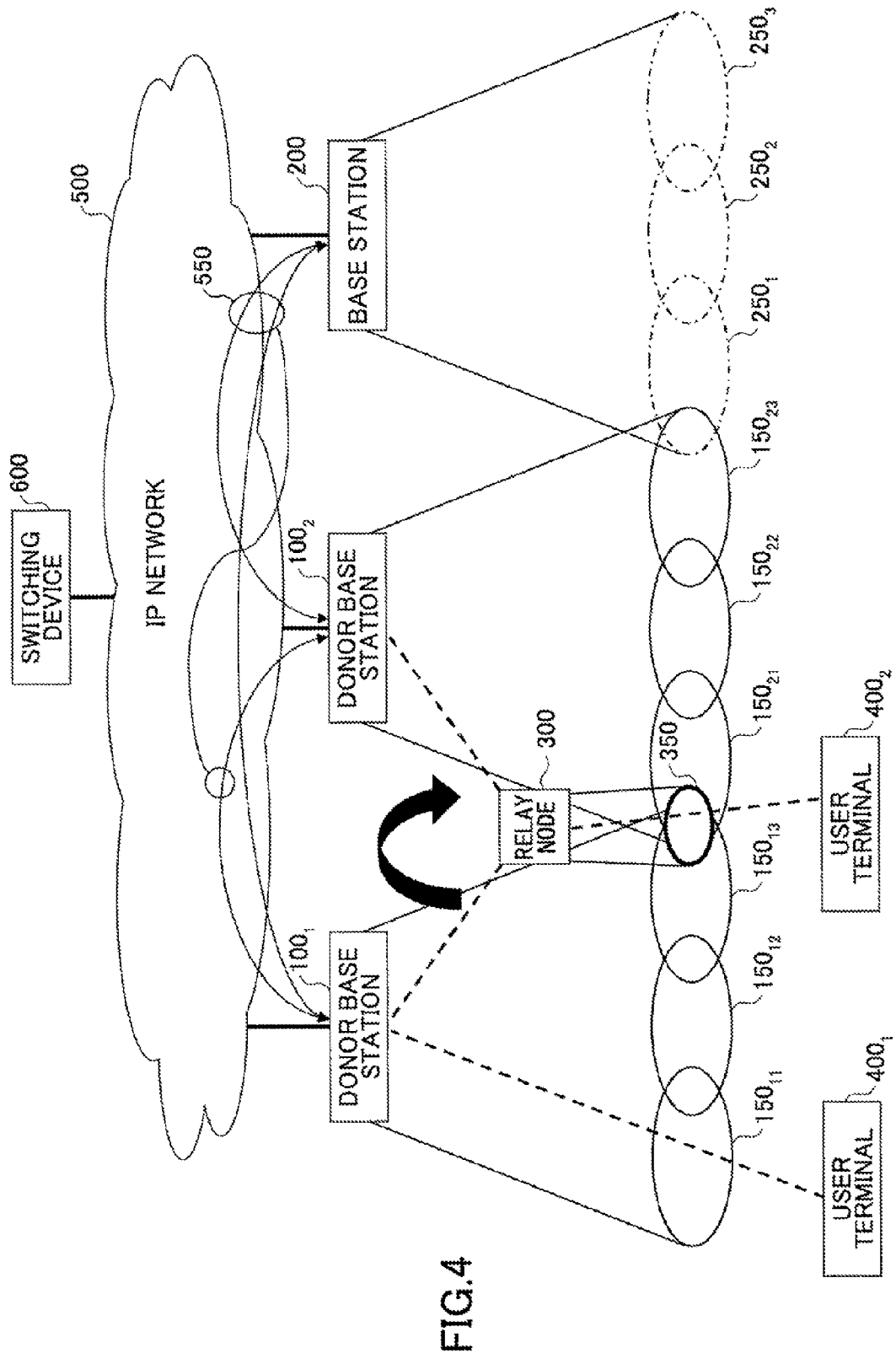
FIG. 4 illustrates an embodiment of a wireless communication system.

FIG. 4 illustrates an embodiment of a wireless communication system.

The wireless communication system includes a base station 200 performing a wireless communication in conformity with LTE. The base station 200 may be called "E-UTRAN Node-B". The base station provides E-UTRA U-Plane and C-Plane. When the U-Plane is provided, processes related to Packet Data Convergence Protocol (PDCP), Radio Link Control (RLC), Medium Access Control (MAC), and PHY are performed. When C-Plane is provided, a process related to RRC is performed. The base station 200 performs processes corresponding to Node-B of Universal Terrestrial Radio Access network (UTRAN) and RNC. The base station 200 covers cells $250_1$, $250_2$ and $250_3$. The base station 200 may cover one or two cells or four or more cells. Two or more base stations may be included in the wireless communication system.

The wireless communication system includes a donor base station $100_n$ (n is an integer satisfying n>0). FIG. 4 is an example in which n is 2. Donor base stations $100_1$ and $100_2$ have function of wireless communication with a relay node 300. The function of wireless communication with the relay node 300 is not provided in the base station 200. The donor base station $100_1$ covers cells $150_{11}$, $150_{12}$ and $150_{13}$. The donor base station $100_2$ covers cells $150_{21}$, $150_{22}$ and $150_{23}$. The donor base station $100_n$ may cover one, two, four or more cells. Three or more donor base stations may be included in the wireless communication system.

The wireless communication system may include a user terminal $400_m$ (m is an integer satisfying m>0) which performs a wireless communication in conformity with LTE. FIG. 4 is an example in which m is 2. For example, the user terminal $400_m$ performs wireless transmission in uplink in conformity with Single Carrier-Frequency Division Multiple Access (SC-FDMA). The user terminal 400m receives in downlink a wireless signal sent in conformity with Orthogonal Frequency Division Multiple Access (OFDMA).

The wireless communication system includes the relay node 300. The relay node 300 relays at least one of communications between the donor base stations $100_1$ and $100_2$ and the user terminals $400_1$ and $400_2$ in layer 3 of the Open Systems Interconnection (OSI) model. The relay nodes may be plural. The relay node 300 performs demodulation and modulation of a signal in downlink from the donor base station $100_1$ or $100_2$. Further, the relay node 300 reproduces user data and conceals, divides and integrates the reproduced user data, encodes and modulates the integrated user data and sends the encoded and modulated user data to the user terminals $400_1$ or $400_2$ with wireless transmission. The relay node 300 covers a relay node cell 350. In the example illustrated in FIG. 4, the relay node 300 covers with the relay node cell 350 a region in which a cell $150_{13}$ covered by the donor base station $100_1$ overlaps a cell $150_{21}$ covered by the donor base station $100_2$.

The wireless communication system includes a switching device 600. The switching device 600 may include a node administrating C-Plane and a node administrating U-Plane. The node administrating C-Plane may be called a "Mobility Management Entity" (MME). The node administrating C-Plane administrates mobile terminal context and stores this. The mobile terminal context includes a user identifier, a mobility state, security and so on. The node administrating U-Plane may be called a "Serving Gateway" (S-GW). The node administrating U-Plane administrates mobile terminal context and stores this. The mobile terminal context includes an IP bearer service parameter, routing information and so on.

The donor base stations $100_1$ and $100_2$, and the base station 200 are connected to the switching device 600 via an IP network 500.

An interface 550 connects the donor base stations $100_1$ and $100_2$ and the base station 200. The interface 550 also connects the donor base station $100_1$ and $100_2$ with the base station 200 and may be called "X2".

<Donor Base Station $100_n$>

Figure 5:
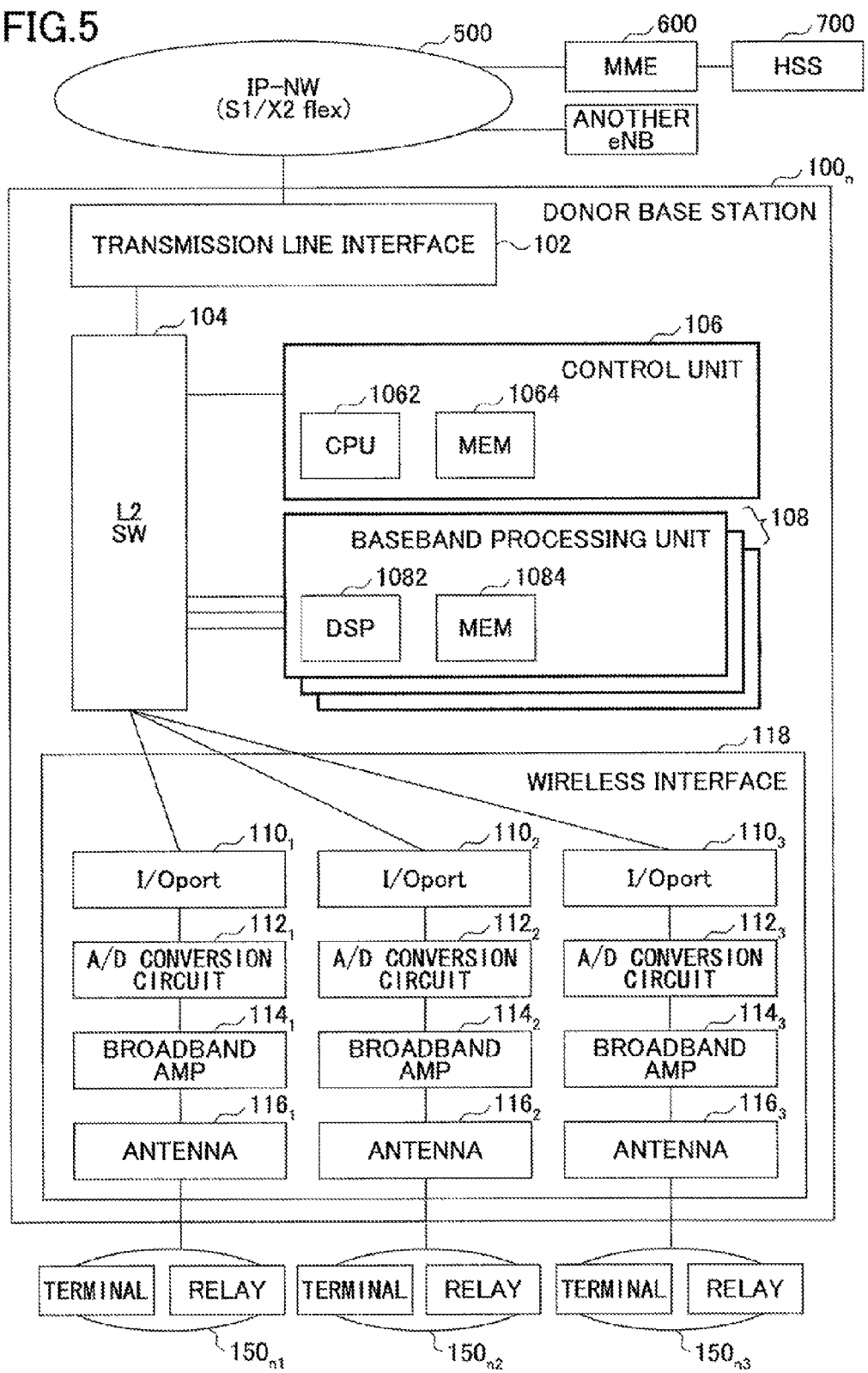
FIG. 5 is a block chart of an exemplary donor base station of the embodiment.

FIG. 5 illustrates an example of the donor base station $100_n$ of the embodiment.

FIG. 5 mainly illustrates a hardware structure.

The donor base station $100_n$ includes a transmission line interface 102, a layer 2 switch (L2SW) 104, a control unit 106, a baseband processing unit 108 and a wireless interface 118.

The wireless interface 118 includes wireless interface pieces proportional to the number of cells covered by the donor base station $100_n$. FIG. 5 illustrates an example in which three cells are covered by the donor base station $100_n$. In a case where the three cells are covered by the donor base station $100_n$, the wireless interface 118 includes input and output ports (I/O port) $110_1$ to $110_3$, A/D conversion circuits $112_1$ to $112_3$, broadband amplifiers (AMP) $114_1$ to $114_3$, and antennas $116_1$ to $116_3$. Suffixes "$_1$", "$_2$", "$_3$" . . . correspond to the cells, respectively.

The transmission line interface 102 interfaces donor base stations other than the donor base station $100_n$ including the transmission line interface 102 and the base station 200 with this donor base station $100_n$. The transmission line interface 102 interfaces the donor base station $100_n$ with the switching device 600. Referring to FIG. 5, the switching device 600 is designated by MME. The MME 600 is connected to a Home Subscriber Server (HSS) 700. The HSS 700 is a database of subscriber information. The HSS 700 administrates authentication information and existence information. The transmission line interface 102 may be called an "X2 interface".

The L2SW 104 is connected to the transmission line interface 102. The L2SW 104 determines a forwarding destination of a packet from the transmission line interface 102 in layer 2. The L2SW 104 transfers a packet from the transmission line interface 102 to an I/O port corresponding to a forwarding destination among input and output ports (I/O ports) $110_1$ to $110_3$ included in the wireless interface 118.

The control unit 106 is connected to the L2SW 104. The control unit 106 includes a CPU 1062 and a memory (MEM) 1064.

The CPU 1062 performs various controls in conformity with a program stored in the MEM 1064. The MEM 1064 stores a program for making the donor base station 100$_n$ function.

The control unit 106 performs call processing. The control unit 106 allocates IP addresses. Specifically, the IP address is allocated to the relay node 300. Further, the control unit 106 pools the IP addresses allocated to the relay node 300. Further, the control unit 106 performs resource control. Further, the control unit 106 controls a connection between the donor base station 100$_n$ and the user terminal 400$_m$. Further, the control unit 106 controls a connection between the donor base station 100$_n$ and the user terminal 400$_m$. Further, the control unit 106 controls a connection between the donor base station 100$_n$ and the relay node 300. Further, the control unit 106 controls a connection between the donor base station 100$_n$ and the relay node 300. Further, the control unit 106 instructs the relay node 300 to measure a receiving quality in downlink. Further, the control unit 106 analyzes the receiving quality in downlink reported from the relay node 300 in response to the instruction. Specifically, the control unit 106 determines whether the relay node 300 is handed over. Furthermore, the control unit 106 monitors and controls various portions of the donor base station 100$_n$.

<Function of Donor Base Station 100$_n$>

Figure 6:
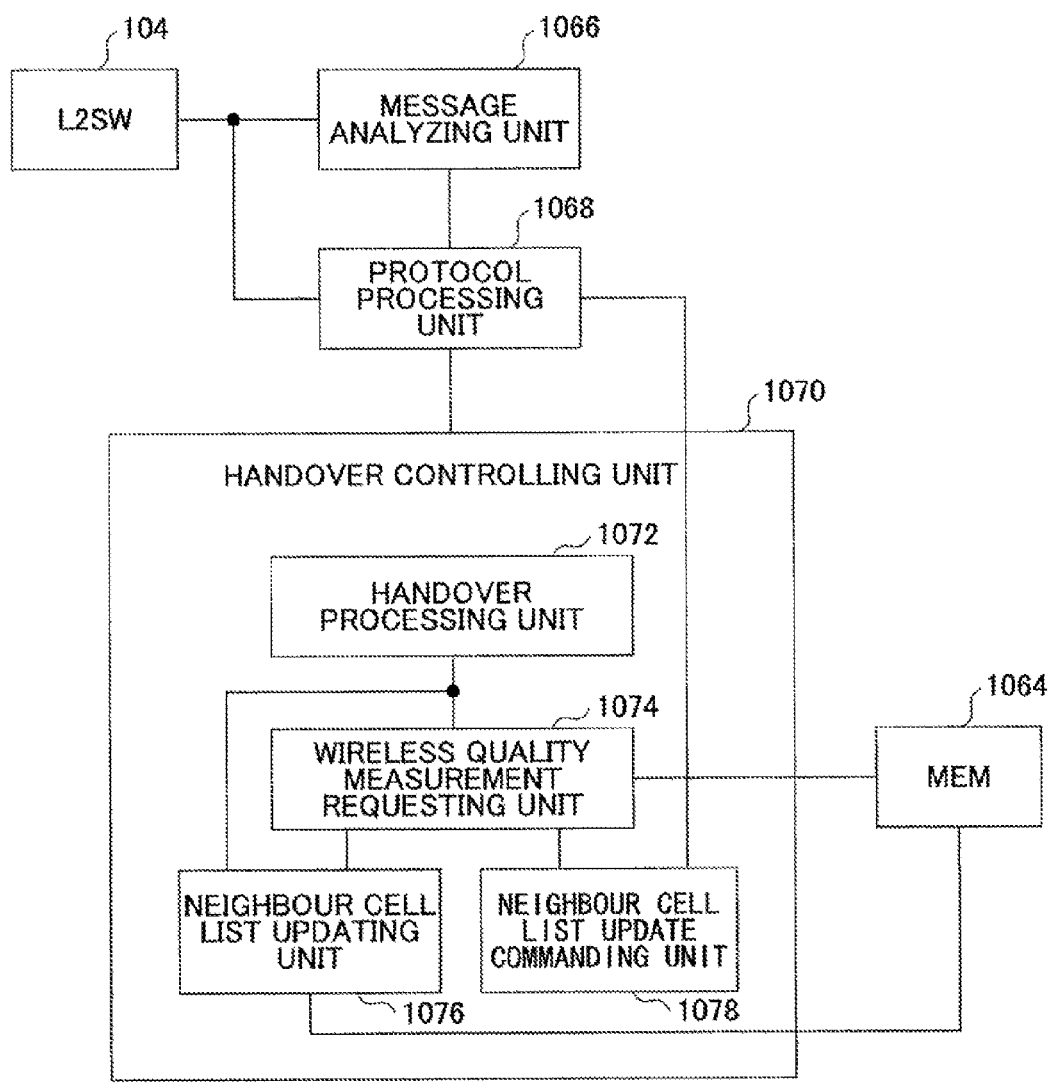
FIG. 6 is a functional block chart of an example of a donor base station of the embodiment.

FIG. 6 illustrates an example of the donor base station 100$_n$ of the embodiment.

The donor base station 100$_n$ includes a message analyzing unit 1066, a protocol processing unit 1068 and a handover controlling unit 1070. The function of the message analyzing unit 1066, the function of the protocol processing unit 1068 and the function of the handover controlling unit 1070 are realized by a CPU 1062. When the CPU 1062 works in conformity with a predetermined program, the CPU 1062 functions as the message analyzing unit 1066, the protocol processing unit 1068 and the handover controlling unit 1070. The handover controlling unit 1070 includes a handover processing unit 1072, a wireless quality measurement requesting unit 1074, a neighbour cell list updating unit 1076 and a neighbour cell list update commanding unit 1078. The CPU 1062 realizes the function of the handover processing unit 1072, the function of the wireless quality measurement requesting unit 1074, the function of the neighbour cell list updating unit 1076 and the function of the neighbour cell list update commanding unit 1078. When the CPU 1062 works in conformity with a predetermined program, the CPU 1062 functions as the handover processing unit 1072, the wireless quality measurement requesting unit 1074, the neighbour cell list updating unit 1076 and the function of the neighbour cell list update commanding unit 1078.

The message analyzing unit 1066 is connected to the L2SW 104. The message analyzing unit 1066 analyzes a message received from the L2SW 104. Specifically, the message analyzing unit 1066 sends the message to the L2SW 104 if the destination of the message is the user terminal 400$_m$ or the relay node 300. Further, the message analyzing unit 1066 sends the message to the protocol processing unit 1068 in a case where the message is information indicative of wireless quality in downlink from the relay node 300, information indicative of a measurement result of the wireless qualities of cells contained in the neighbour cell list corresponding to the cell at the handover destination, or neighbour cell list changing information from the other donor base stations. The neighbour cell list changing information is described later.

The protocol processing unit 1068 is connected to the L2SW 104 and the message analyzing unit 1066. The protocol processing unit 1068 makes the handover controlling unit 1070 input information indicative of wireless qualities in downlink from the message analyzing unit 1066 and information indicative of the measurement result of the wireless qualities of the cells contained in the neighbour cell list corresponding to the cell at the handover destination. Further, the protocol processing unit 1068 makes the handover controlling unit 1070 input neighbour cell list changing information from the message analyzing unit 1066. Further, the protocol processing unit 1068 performs protocol conversion for sending the neighbour cell list to be reported to the relay node belonging to the donor base station 100$_n$. The neighbour cell list is included in an X2 message.

FIG. 7 illustrates an exemplary neighbour cell list of the embodiment.

The neighbour cell list includes Message Type, Handover Relay ID, Direction, and Neighbour cell number.

Message type indicates an identifier for distinguishing a message. Handover Relay ID indicates an identification ID of a relay node triggering the message and having been handed over previously. Direction indicates whether a sending direction is from Source to Target or from Target to Source. Said differently, Direction indicates whether the message is sent from the donor base station at the handover source to another donor base station at the handover destination or the message is sent from the other donor base station at the handover destination to the donor base station at the handover source. Neighbour cell number indicates the number of cells (the information) contained in the neighbour cell list.

The neighbour cell list includes neighbour cell information pieces corresponding to the number of neighbour cells. The neighbour cell information includes an E-UTRAN cell global ID (ECGI: E-UTRAN Cell Global ID), a physical cell ID (PCI: Physical Cell Identities), and EARFCN. ECGI represents a global ID of the E-UTRAN cell global ID.

PCI stands for physical cell ID. PCI relates to the neighbour cell. EARFCN stands for E-UTRAN Absolute Radio Frequency Channel Number. EARFCN relates to Frequency Division Duplex (FDD) in downlink.

The protocol processing unit 1068 performs protocol conversion for receiving neighbour cell list changing information reported from another donor base station 100$_n$ when a relay node 300 existing in a cell belonging to a donor base station is handed over to the other donor base station. The protocol processing unit 1068 performs protocol conversion for receiving neighbour cell list changing information reported from another donor base station 100$_n$ when a relay node 300 existing in a cell belonging to a donor base station is handed over to the other donor base station. The neighbour cell list is included in an X2 message.

FIG. 8 illustrates first neighbour cell list changing information as an example. The neighbour cell list changing information illustrated in FIG. 8 is sent by a donor base station at the handover destination.

The neighbour cell list changing information includes Message type, Handover Relay ID and Delete Neighbour cell number. Message type indicates an identifier for distinguishing the message. Handover Relay ID indicates an identification ID of the relay node triggering the message and having been handed over previously. Delete Neighbour cell number indicates the number of cells to be deleted from the neighbour cell list. Further, the neighbour cell list changing information further includes neighbour cell information pieces corresponding to the number of neighbour cells to be deleted. The neighbour cell information includes ECGI, PCI and EARFCN. ECGI indicates a global ID of the neighbour cell of E-UTRAN cell. PCI stands for physical cell ID. PCI relates to the neighbour cell. EARFCN relates to FDD in downlink.

FIG. 9 illustrates second neighbour cell list changing information as an example. The neighbour cell list changing information illustrated in FIG. 9 is sent by a donor base station at the handover destination.

The neighbour cell list changing information includes Message type, Handover Relay ID and Add Neighbour cell number. Message type indicates a message type for distinguishing the message, i.e., an identifier. Handover Relay ID indicates an identification ID of the relay node triggering the message and having been handed over previously. Add Neighbour cell number indicates the number of cells to be added to the neighbour cell list. Further, the neighbour cell list changing information further includes neighbour cell information pieces corresponding to the number of neighbour cells to be added. The neighbour cell information includes ECGI, PCI and EARFCN. ECGI indicates a global ID of the neighbour cell of E-UTRAN cell. PCI stands for physical cell ID. PCI relates to the neighbour cell. EARFCN relates to FDD in downlink.

The handover controlling unit 1070 controls handover of the relay node 300 existing in a cell belonging to a donor base station $100_n$ to a cell belonging to another donor base station. The handover controlling unit 1070 controls handover of the relay node 300 from a cell belonging to the other donor station to a cell belonging to the donor station $100_n$.

<Moment of Handover>

The relay node 300 generates an event as a result of measuring quality of a cell. The relay node reports that the event is generated to a donor base station connected to the donor base station when the event is generated.

Figure 10:
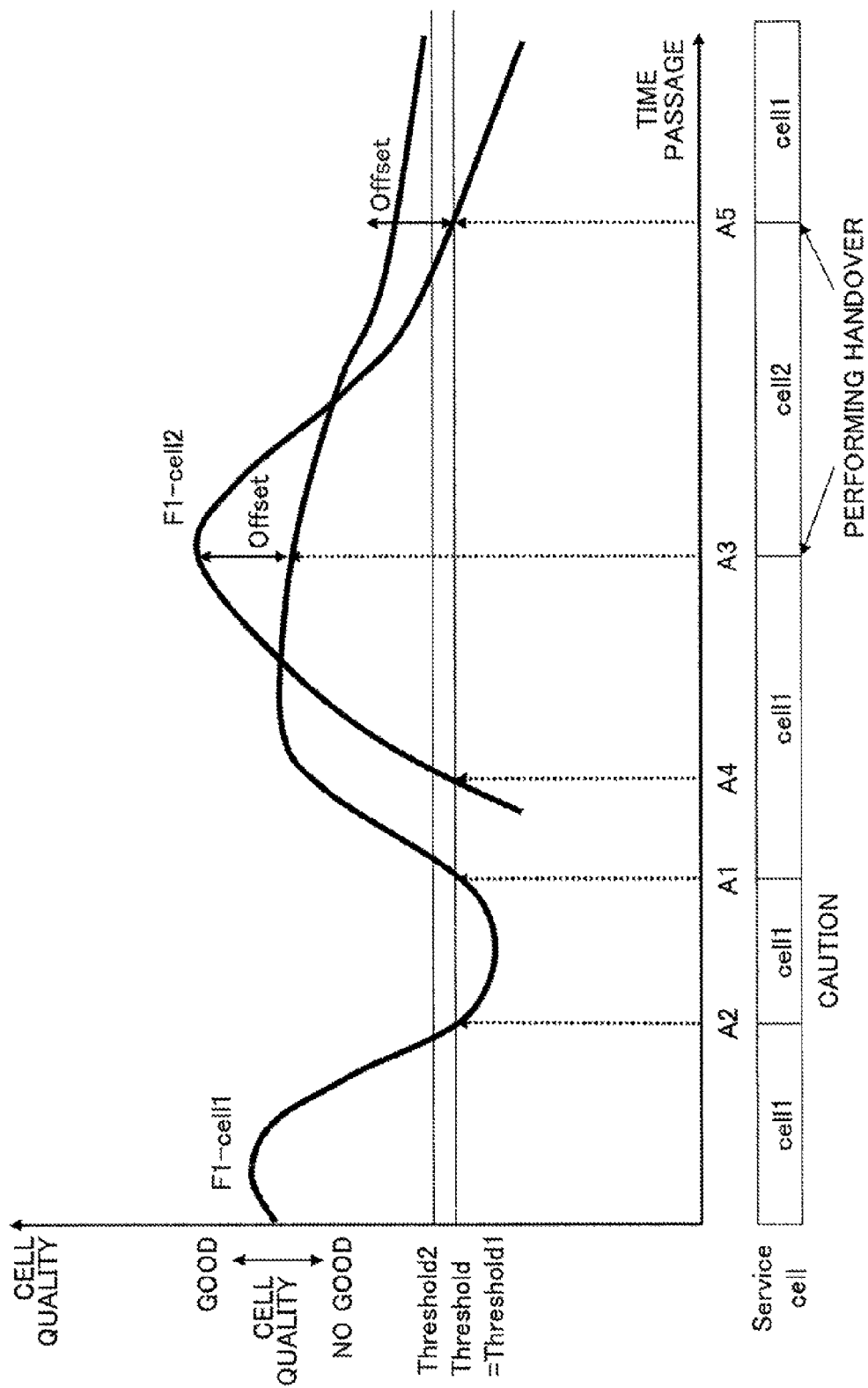
FIG. 10 illustrates an event generated in the relay node of the embodiment.

FIG. 10 illustrates an exemplary event generated in the relay node 300. Referring to FIG. 10, the abscissa axis designates a time and the ordinate axis designates a cell quality (e.g., a wireless quality). FIG. 10 illustrates events generated in the relay node 300 such as an event A1, an event A2, an event A3, an event A4, and an event A5.

The event A1 corresponds to a case where the cell quality of a serving base station is the same as or stronger than a threshold value "Threshold".

The event A2 corresponds to a case where the cell quality of the serving base station is weaker (smaller) than the threshold value Threshold. When the event A2 occurs, the relay node 300 may caution that the wireless quality is degraded.

The event A3 corresponds to a case where the cell quality of a neighbour cell becomes the same as or stronger than the cell quality of the serving base station by an offset "Offset".

The event A4 corresponds to a case where the cell quality of a neighbour cell becomes the same as or stronger than the threshold value Threshold.

The event A5 corresponds to a case where the cell quality of the serving base station becomes weaker (smaller) than a threshold "Threshold1" and the cell quality of the neighbour cell becomes the same as or stronger (higher) than a threshold value "Threshold2". In the event A5, under a situation where the event A2 is generated, if the cell quality becomes the threshold Threshold2 (Threshold2>Threshold1) or greater even though the event A3 is not generated, the handover is enabled. Therefore, if the offset in the event A3 becomes smaller than Threshold2−Threshold1 (Offset<Threshold2−Threshold1), the handover is not generated.

At the threshold Threshold2, the cell quality is the same as or stronger than the cell quality at the threshold Threshold1. The threshold Threshold1 may be the same as the threshold Threshold2.

Further, an event B1 and an event B2 may be defined.

The event B1 corresponds to a case where the cell quality of a neighbour cell in handover in inter radio access technology (Inter RAT) becomes the same as or stronger (higher) than the threshold value Threshold.

The event B2 corresponds to a case where the cell quality of the serving base station becomes weaker (lower) than the threshold Threshold1 and the cell quality of the neighbour cell in Inter RAT becomes the same as or stronger (higher) than the threshold value Threshold2.

The handover processing unit 1072 is connected to the protocol processing unit 1068. The handover processing unit 1072 determines whether the relay node 300, which has sent information indicative of the wireless quality in downlink, is handed over to the other donor base station base on a wireless quality in downlink to be input by the protocol processing unit 1068.

Figure 11:
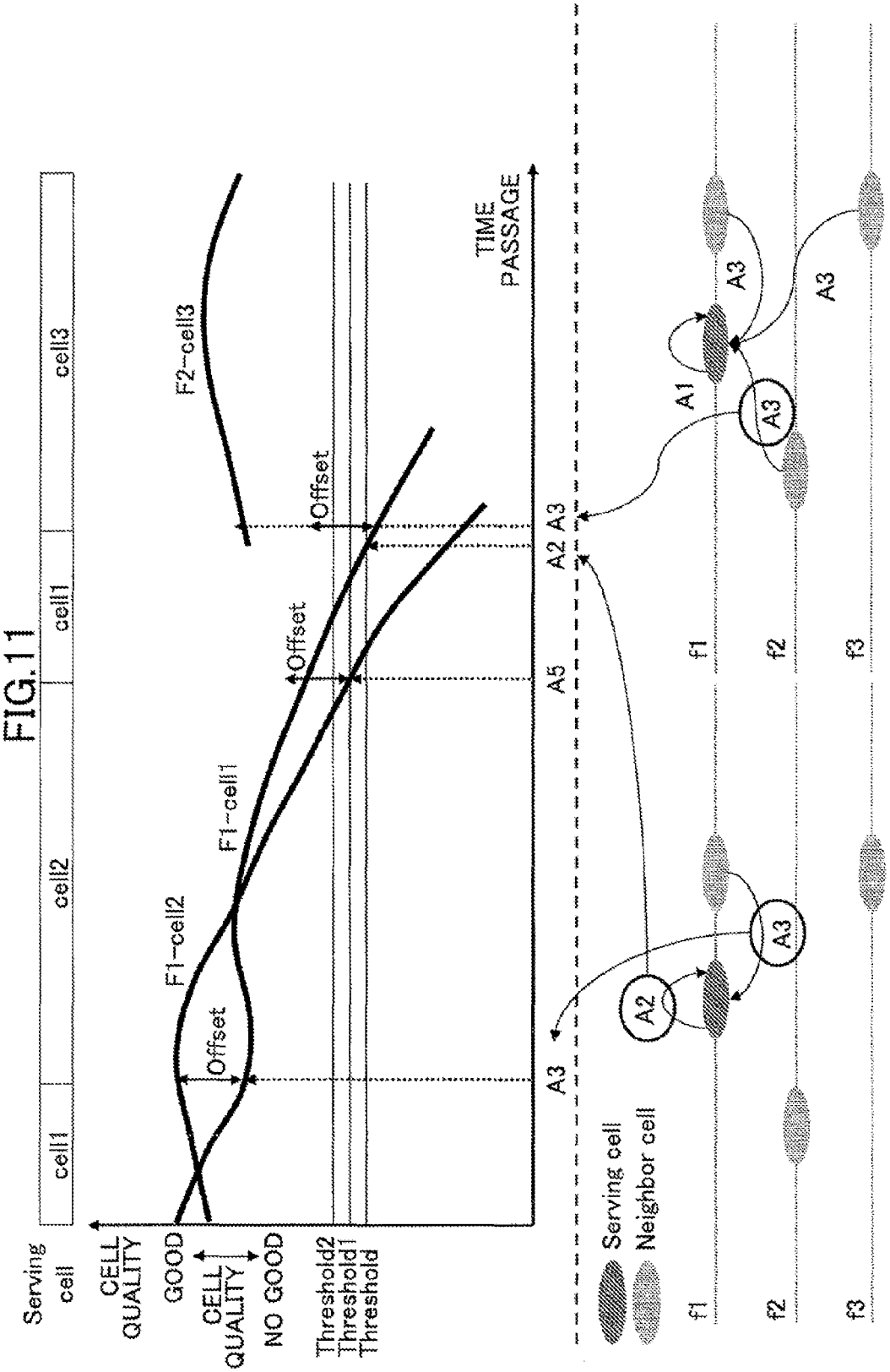
FIG. 11 illustrates an exemplary handover of the relay node of the embodiment.

FIG. 11 illustrates an exemplary Inter-frequency handover.

A relay node 300 existing in a cell) may be handed over to a cell2 at a time (moment) of an event A3.

The relay node 300 handed over to the cell2 may be handed over to the cell) at a time (moment) of an event A5.

Then, an event A2 may occur in the relay node 300 handed over to the cell). However, if a neighbour cell is not found, the connection with the cell 1 is maintained.

The relay node 300 may be handed over to a cell3 at a time (moment) of an event A3.

Figure 12:
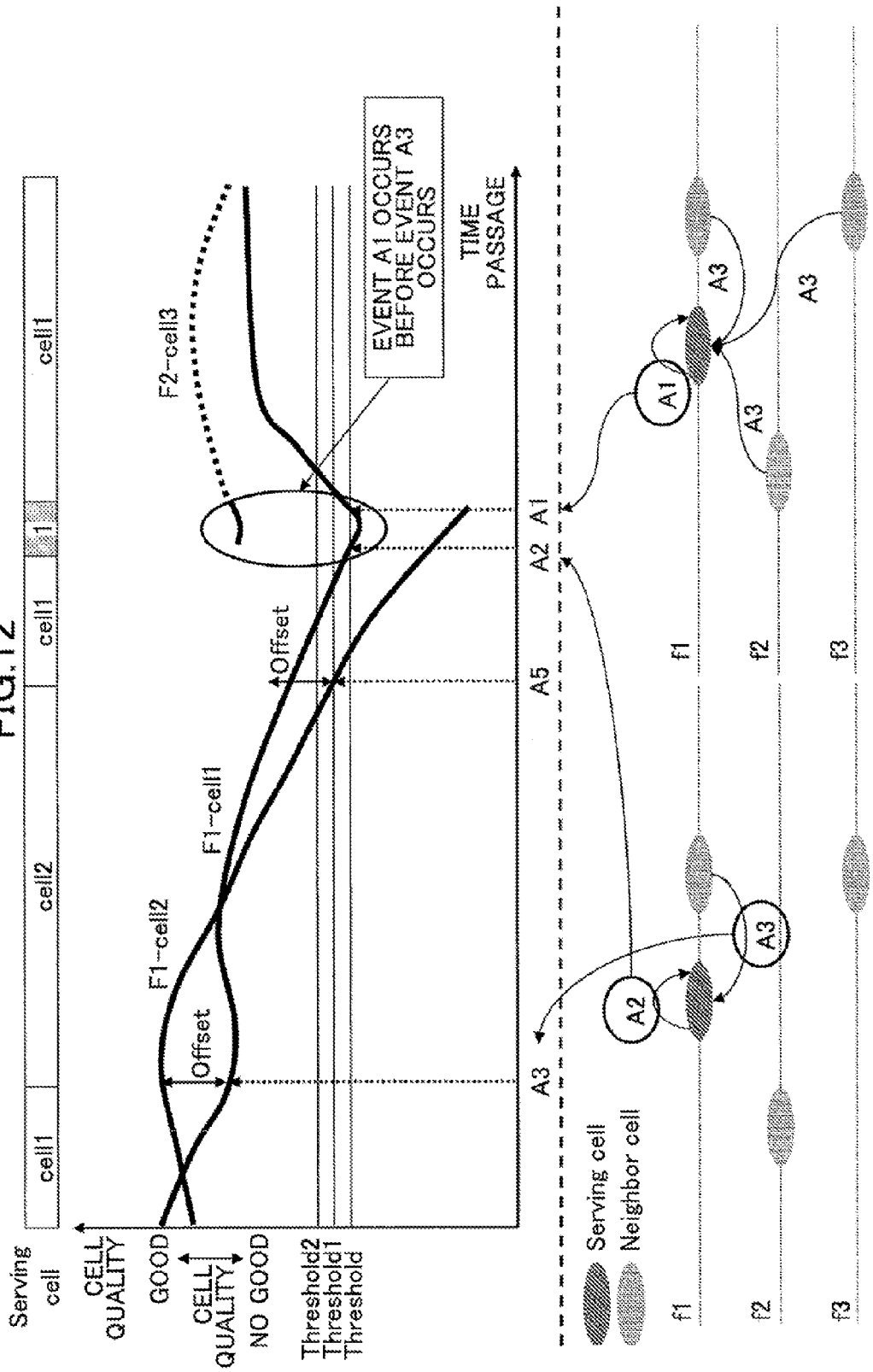
FIG. 12 illustrates another exemplary handover of the relay node of the embodiment.

FIG. 12 illustrates an example in which Inter-frequency handover is not performed.

The relay node 300 existing in the cell may be handed over to the cell2 at a time (moment) of the event A3.

The relay node 300 handed over to the cell2 may be handed over to the cell at a time (moment) of an event A5.

Then, the event A2 may occur in the relay node 300 handed over to the cell. However, if a neighbour cell is not found, the connection with the cell is maintained.

Since the event A1 occurs the connection with the cell is maintained.

The handover processing unit 1072 processes to hand over the relay node 300 to and from the other donor base station. The handover processing unit 1072 reports that the handover is performed to the wireless quality measurement requesting unit 1074 at a time of handing over the relay node 300 between the handover processing unit 1072 and another base station.

Further, the handover processing unit 1072 sends neighbour cell list update information sent from the other donor base station when the above handover is performed to the neighbour cell list updating unit 1076 so that the neighbour cell list updating unit 1076 receives the neighbour cell list update information.

The wireless quality measurement requesting unit 1074 is connected to the handover processing unit 1072. The wireless quality measurement requesting unit 1074 is connected to the handover processing unit 1072 and the memory (MEM) 1064. The wireless quality measurement requesting unit 1074 receives information indicating that the handover is to be performed when the relay node 300 is to be handed over between the donor base station $100_n$ and another donor base station from the handover processing unit 1072. The wireless quality measurement requesting unit 1074 reports a wireless quality measurement requesting signal including a neighbour cell list corresponding to the cell at the handover destination to the relay node 300 when the cell at the handover destination belongs to the donor base station. The wireless quality measurement requesting unit 1074 receives a measurement result of a wireless quality measured by the relay node 300. Specifically, the measurement result of the wireless qualities of the cells contained in the neighbour cell list may be received by the wireless quality measurement requesting unit 1074.

The wireless quality measurement requesting unit 1074 sends the measurement result of the wireless quality obtained from the relay node to the neighbour cell list updating unit 1076 and the neighbour cell list update commanding unit 1078 so that the neighbour cell list updating unit 1076 and the neighbour cell list update commanding unit 1078 receive the measurement result of the wireless quality obtained from the relay node. The measurement result may contain information indicative of the cells and information indicating whether the wireless qualities of the cells are higher than the threshold value.

The neighbour cell list updating unit 1076 is connected to the memory (MEM) 1064, the handover processing unit 1072, and the wireless quality measurement requesting unit 1074. The neighbour cell list updating unit 1076 updates the neighbour cell list to be stored in the memory (MEM) 1064. The neighbour cell list updating unit 1076 stores the updated neighbour cell list in the memory (MEM) 1064.

<Case where a Donor Base Station Includes a Cell at a Handover Destination>

The neighbour cell list updating unit 1076 updates the neighbour cell list based on information indicative of the measurement result of the wireless quality of the cell contained in the neighbour cell list corresponding to the cell at the handover destination which is to be input by the wireless quality measurement requesting unit 1074. Specifically, the neighbour cell list updating unit 1076 registers a cell belonging to the relay node to the neighbour cell list corresponding to the cell determined to have a good wireless quality. Specifically, the neighbour cell list updating unit 1076 deletes a cell belonging to the relay node from the neighbour cell list corresponding to the cell determined to have a bad wireless quality.

<Case where a Donor Base Station does not Include a Cell at a Handover Destination>

The neighbour cell list updating unit 1076 determines whether the cell belonging to the donor base station is contained in the neighbour cell list update information which is input by the handover processing unit 1072. In a case where the cell belonging to the donor base station and information of adding the cell belonging to the relay node are contained in the neighbour cell list update information, information indicative of the cell belonging to the relay node is added to the neighbour cell information corresponding to the cell belonging to the donor base station, which is contained in the neighbour cell list update information among the neighbour cell list corresponding to the cells to be stored in the memory (MEM) 1064. In a case where the cell belonging to the donor base station and information of deleting the cell belonging to the relay node are contained in the neighbour cell list update information, information indicative of the cell belonging to the relay node is deleted from the neighbour cell information corresponding to the cell belonging to the donor base station, which is contained in the neighbour cell list update information among the neighbour cell list corresponding to the cells to be stored in the memory (MEM) 1064.

The neighbour cell list update commanding unit 1078 is connected to the protocol processing unit 1068 and the wireless quality measurement requesting unit 1074. In a case where the cell at the handover destination belongs to the donor base station, the neighbour cell list update commanding unit 1078 generates the neighbour cell list update information for requesting update of the neighbour cell list in at least one of donor base stations other than the donor base station and the base station 200 based on the information indicative of the measurement result of the wireless quality of the cell contained in the neighbour cell list to be input by the wireless quality measurement requesting unit 1074. The neighbour cell list update commanding unit 1078 sends the neighbour cell list update information to the protocol processing unit 1068 so that the protocol processing unit 1068 receives the neighbour cell list update information. The protocol processing unit 1068 performs protocol conversion for sending the neighbour cell list update information as an X2 message.

The neighbour cell list update commanding unit 1078 generates the neighbour cell list update information for requesting addition or deletion of the information indicative of the cell belonging to the relay node 300 to and from the neighbour cell list in at least one of the donor base stations and the base station 200 based on the information indicative of the measurement result of the wireless quality of the cell contained in the neighbour cell list to be input by the wireless quality measurement requesting unit 1074. Specifically, the neighbour cell list update commanding unit 1078 generates the neighbour cell list update information for requesting registration of the cell belonging to the relay node in the neighbour cell list of the cell to at least one of the donor base station and the base station, to which the cell having a good wireless quality belong. Specifically, the neighbour cell list update commanding unit 1078 generates the neighbour cell list update information for requesting deletion of the cell belonging to the relay node from the neighbour cell list of the cell to at least one of the donor base station and the base station, to which the cell having a bad wireless quality belong.

The baseband processing unit 108 is connected to the L2SW 104. Referring to FIG. 5, the baseband processing unit 108 includes a digital signal processor (DSP) 1082 and a memory (MEM) 1084.

The DSP 1082 performs various controls in conformity with a program stored in the MEM 1084. The MEM 1084 stores a program for making the donor base station 100$_n$ function as a donor base station.

The baseband processing unit 108 sends and receives information to and from the control unit 106. The baseband processing unit 108 administrates traffic (e.g., traffic volume of data). Specifically, the baseband processing unit 108 administrates General Packet Radio Service (GPRS) Tunneling Protocol (GTP). The baseband processing unit 108 administrates a transfer of the traffic. Specifically, GTP is transferred. The baseband processing unit 108 monitors the traffic. Specifically, conditions of cells are monitored. The baseband processing unit 108 performs setup of concealment and release of the concealment. Further, the baseband processing unit 108 administrates MAC multiplexing and MAC demultiplexing. Further, the baseband processing unit 108 performs synchronous processing. Further, the baseband processing unit 108 performs paging.

The wireless interface 118 is connected to the L2SW 104.

The I/O ports 110$_1$ to 110$_3$ are connected to the L2SW 104.

A/D conversion circuits 112$_1$ to 112$_3$ are connected to the I/O ports 110$_1$ to 110$_3$, respectively. The A/D conversion circuits 112$_1$ to 112$_3$ convert analog signals from the I/O ports 110$_1$ to 110$_3$ to digital signals, respectively.

Broadband amplifiers (broadband AMPs) 114$_1$ to 114$_3$ are connected to the A/D conversion circuits 112$_1$ to 112$_3$, respectively. The broadband AMPs 114$_1$ to 114$_3$ amplify the digital signals from the A/D conversion circuits 112$_1$ to 112$_3$, respectively.

The antennas 116$_1$ to 116$_3$ are connected to the broadband AMPs 114$_1$ to 114$_3$, respectively. The antennas 116$_1$ to 116$_3$ wirelessly send signals from the broadband AMPs 114$_1$ to 114$_3$, respectively. The wireless signals sent from the antennas $116_1$ to $116_3$ are sent to at least one of a user terminal $400m$ and a relay node 300 existing in the corresponding cell.

<Base Station>

Figure 13:
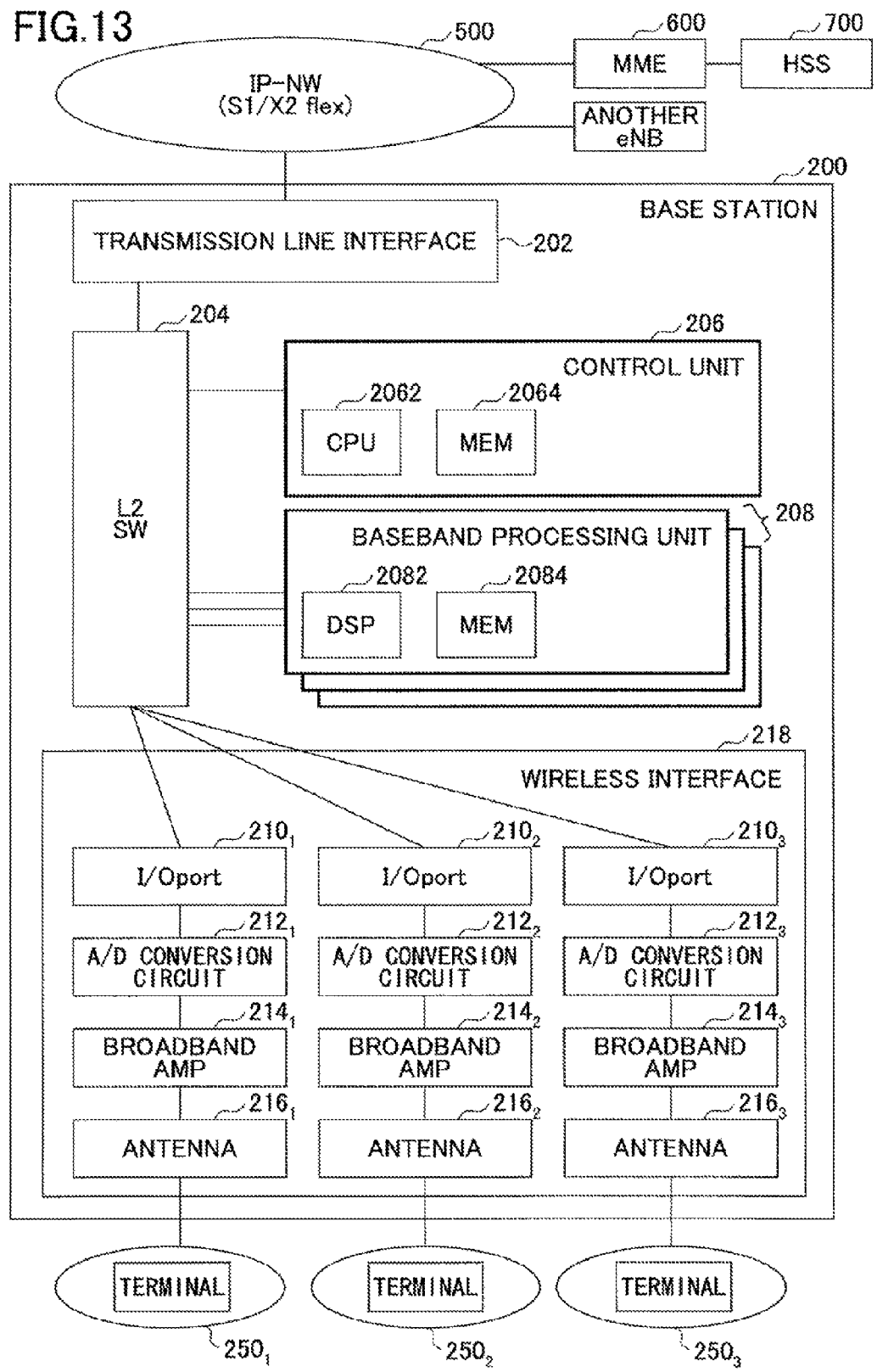
FIG. 13 is a block chart illustrating an exemplary base station of the embodiment.

FIG. 13 illustrates an exemplary base station 200 of the embodiment.

FIG. 13 mainly illustrates a hardware structure.

The base station 200 includes a transmission line interface 202, a layer 2 switch (L2SW) 204, a control unit 206, a baseband processing unit 208 and a wireless interface 218.

The wireless interface 218 includes wireless interface pieces proportional to the number of cells covered by the base station 200. FIG. 13 illustrates an example in which three cells are covered by the base station 200. In a case where the three cells are covered by the base station 200, the wireless interface 218 includes input and output ports (I/O port) $210_1$ to $210_3$, A/D conversion circuits $212_1$ to $212_3$, broadband amplifiers (AMP) $214_1$ to $214_3$, and antennas $216_1$ to $216_3$. Suffixes "$_1$", "$_2$", "$_3$" . . . correspond to the cells, respectively.

The transmission line interface 202 interfaces base stations and donor base stations other than this base station 200 including the transmission line interface 202 with this base station 200. The transmission line interface 202 interfaces base station 200 with a switching device 600. Referring to FIG. 13, the switching device 600 is designated by MME. The MME 600 is connected to a Home Subscriber Server (HSS) 700. The HSS 700 is a database of subscriber information. Further, the HSS 700 is used for administrating authentication information and existence information. The transmission line interface 202 may be called an X2 interface.

The L2SW 204 is connected to the transmission line interface 202. The L2SW 204 determines a forwarding destination of a packet from the transmission line interface 202 in layer 2. The L2SW 204 transfers a packet from the transmission line interface 202 to an I/O port corresponding to a forwarding destination among the I/O ports $210_1$ to $210_3$ included in the wireless interface 218.

The control unit 206 is connected to the L2SW 204. The control unit 206 includes a CPU 2062 and a memory (MEM) 2064.

The CPU 2062 performs various controls in conformity with a program stored in the MEM 2064. The MEM 2064 stores a program causing the base station 200 to function as a base station.

The control unit 206 performs call processing. Further, the control unit 206 performs resource control. Further, the control unit 206 controls a connection between the base station 200 and a user terminal $400_m$. Further, the control unit 206 controls a connection between the base station 200 and a user terminal $400_m$. Further, the control unit 206 instructs the user terminal $400_m$ to measure a receiving quality in downlink. Further, the control unit 206 analyzes the receiving quality in downlink reported from the user terminal $400_m$ in response to the instruction. Specifically, the control unit 206 determines whether the user terminal $400_m$ is handed over. Furthermore, the control unit 206 monitors and controls various portions of the base station 200.

<Operation of Base Station 200>

Figure 14:
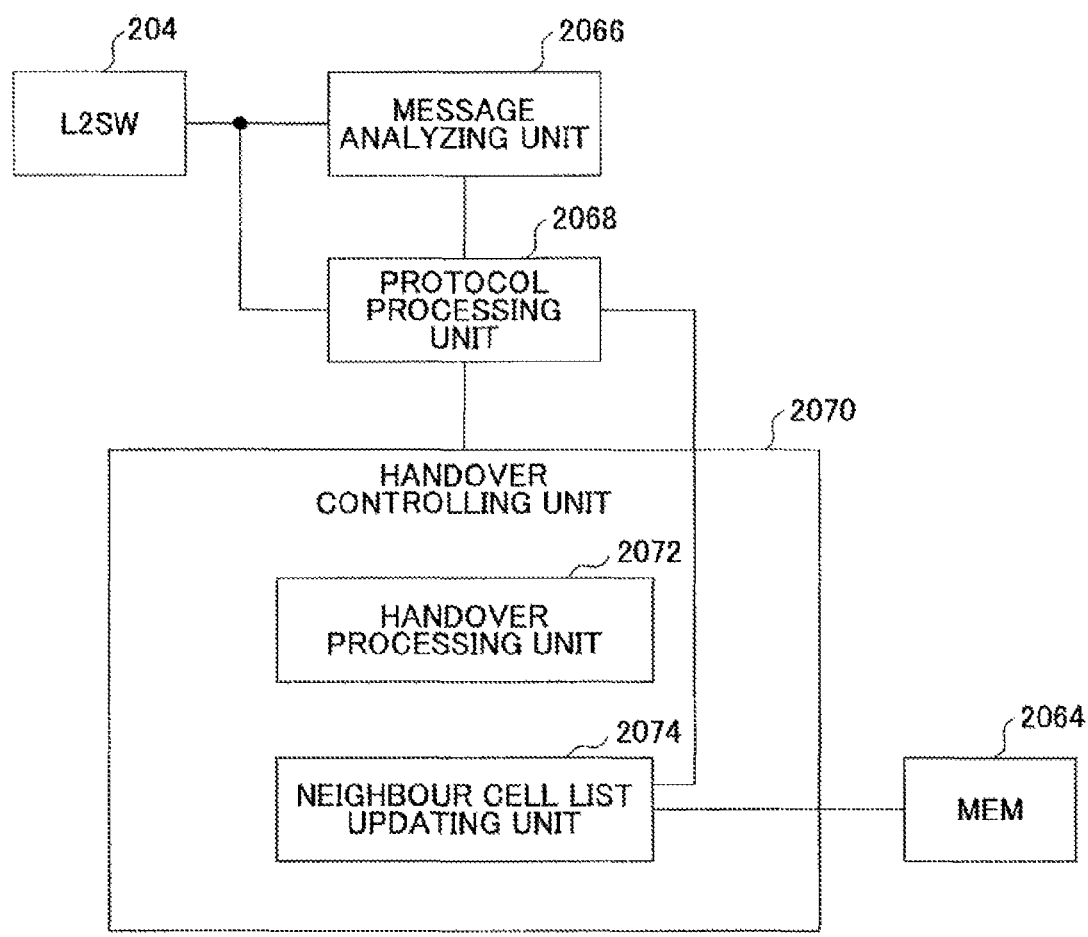
FIG. 14 is a functional block chart of the exemplary base station of the embodiment.

FIG. 14 illustrates an exemplary operation of the base station 200 of the embodiment.

The base station 200 includes a message analyzing unit 2066, a protocol processing unit 2068 and a handover controlling unit 2070. The function of the message analyzing unit 2066, the function of the protocol processing unit 2068 and the function of the handover controlling unit 2070 are realized by a CPU 2062. When the CPU 2062 works in conformity with a predetermined program, the CPU 2062 functions as the message analyzing unit 2066, the protocol processing unit 2068 and the handover controlling unit 2070. The handover controlling unit 2070 includes a handover processing unit 2072 and a neighbour cell list updating unit 2074. The function of the handover processing unit 2072 and the function of the neighbour cell list updating unit 2074 are realized by the CPU 2062. When the CPU 2062 works in conformity with the predetermined program, the CPU 2062 functions as the handover processing unit 2072 and the neighbour cell list updating unit 2074.

The message analyzing unit 2066 is connected to the L2SW 204. The message analyzing unit 2066 analyzes a message received from the L2SW 204. Specifically, the message analyzing unit 2066 sends the message to the L2SW 204 if the destination of the message is the user terminal $400_m$. Further, the message analyzing unit 2066 sends the message to the protocol processing unit 2068 if the message contains information indicative of a wireless quality from the user terminal $400m$ in downlink or neighbour cell list changing information from the donor base station so that the message is received by the protocol processing unit 2068.

The protocol processing unit 2068 is connected to the L2SW 204 and the message analyzing unit 2066. The protocol processing unit 2068 sends information indicative of a wireless quality in downlink from the message analyzing unit 2066 to the handover controlling unit 2070. Further, the protocol processing unit 2068 makes the handover controlling unit 2070 input neighbour cell list changing information from the message analyzing unit 2066.

The handover controlling unit 2070 controls handover of the user terminal $400_m$ belonging to the base station 200 to the donor base station or a base station other than this base station. Further, the handover controlling unit 2070 controls handover of the user terminal $400m$ from the donor base station and the other base station to this base station 200.

The handover processing unit 2072 is connected to the protocol processing unit 2068. The handover processing unit 2072 determines whether the user terminal $400_m$, which has sent information indicative of the wireless quality in downlink, is handed over to the donor base station or the other base station base on the wireless quality in downlink to be input by the protocol processing unit 2068.

The handover processing unit 2072 processes to hand over the user terminal $400_m$ with the donor base station or the other base station.

The neighbour cell list updating unit 2074 is connected to the protocol processing unit 2068. The neighbour cell list updating unit 2074 determines whether the cell belonging to the base station is contained in the neighbour cell list update information which is input by the protocol processing unit 2068. In a case where the cell belonging to the base station and information of adding the cell belonging to the relay node are contained in the neighbour cell list update information, information indicative of the cell belonging to the relay node is added to the neighbour cell list corresponding to the cell belonging to the base station, which is contained in the neighbour cell list update information among the neighbour cell list corresponding to the cells to be stored in the memory MEM 2064. Further, in a case where the cell belonging to the base station and information of deleting the cell belonging to the relay node are contained in the neighbour cell list update information, information indicative of the cell belonging to the relay node is deleted from the neighbour cell list corresponding to the cell belonging to the base station, which is contained in the neighbour cell list update information among the neighbour cell list corresponding to the cells to be stored in the memory MEM 2064. It is designated by "deleting neighbour cell number" or "adding neighbour cell number"

of the neighbour cell list update information whether the information is deleted or added.

The baseband processing unit 208 is connected to the L2SW 204. The control unit 206 includes a DSP 2082 and a memory (MEM) 2084.

The DSP 2082 performs various controls in conformity with a program stored in the MEM 2084. The MEM 2084 stores a program causing the base station 200 to function as a base station.

The baseband processing unit 208 sends and receives information to and from the control unit 206. The baseband processing unit 208 monitors traffic (e.g., traffic volume of data). Specifically, conditions of cells are monitored. The baseband processing unit 208 performs setup of concealment and release of the concealment. Further, the baseband processing unit 208 administrates MAC multiplexing and MAC demultiplexing. Further, the baseband processing unit 208 performs synchronous processing. Further, the baseband processing unit 208 performs paging.

The wireless interface 218 is connected to the L2SW 204.

The I/O ports $210_1$ to $210_3$ are connected to the L2SW 204.

A/D conversion circuits $212_1$ to $212_3$ are connected to the I/O ports $210_1$ to $210_3$, respectively. The A/D conversion circuits $212_1$ to $212_3$ convert analog signals from the I/O ports $210_1$ to $210_3$ to digital signals, respectively.

Broadband amplifiers (broadband AMPs) $214_1$ to $214_3$ are connected to the A/D conversion circuits $212_1$ to $212_3$, respectively. The broadband AMPs $214_1$ to $214_3$ amplify the digital signals from the A/D conversion circuits $212_1$ to $212_3$, respectively.

The antennas $216_1$ to $216_3$ are connected to the broadband AMPs $214_1$ to $214_3$, respectively. The antennas $216_1$ to $216_3$ wirelessly send signals from the broadband AMPs $214_1$ to $214_3$, respectively. Wireless signals from the antennas $216_1$ to $216_3$ are sent to the user terminal $400_m$ existing in the corresponding cell.

<Relay Node>

Figure 15:
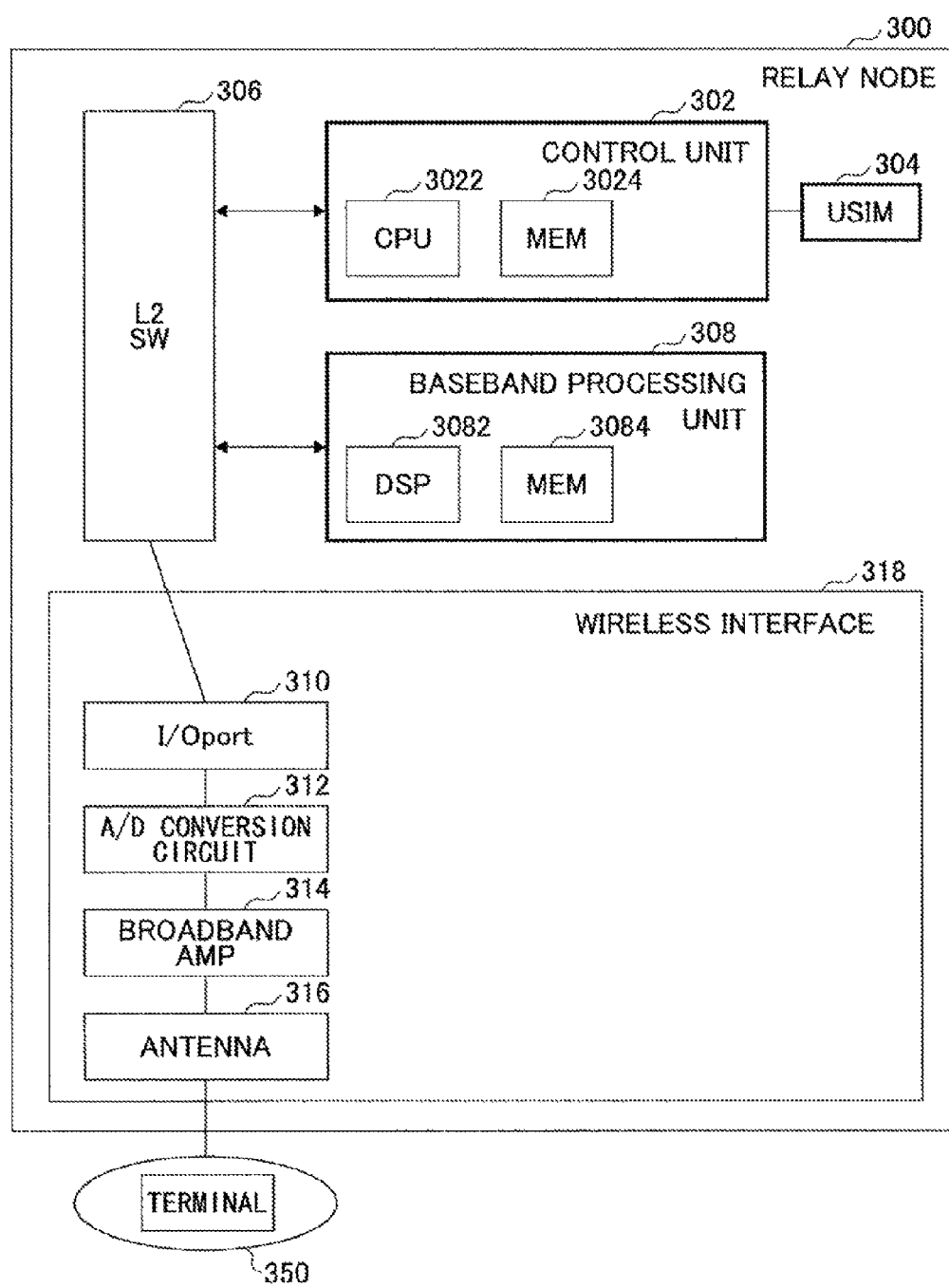
FIG. 15 illustrates an exemplary relay node of the embodiment.

FIG. 15 illustrates an exemplary relay node 300 of the embodiment.

FIG. 15 mainly illustrates a hardware structure.

The relay node 300 includes a control unit 302, a USIM 304, a L2SW 306, a baseband processing unit 308 and a wireless interface 318. The relay node 300 can wirelessly communicate with a terminal 350.

The wireless interface 318 includes wireless interface pieces proportional to the number of cells covered by the relay nodes 300. FIG. 15 illustrates an example in which one cell is covered by the relay node 300. In a case where the one cell is covered by the relay node 300, the wireless interface 318 includes an input and output port (I/O port) 310, an A/D conversion circuit 312, a broadband amplifiers (AMP) 314, and an antenna 316. Two or more cells may be covered by the relay node 300.

The control unit 302 includes a CPU 3022 and a memory (MEM) 3024.

The CPU 3022 performs various controls in conformity with a program stored in the MEM 3024. A program for functioning the relay node 300 is stored in the MEM 3024.

The control unit 302 has functions as a terminal and a base station.

The control unit 302 performs call processing between the control unit 302 and the donor base station when the control unit 302 functions as the terminal. The control unit 302 performs a resource control at a time of performing the function of the terminal. The control unit 302 administrates a connection between the relay node 300 and the donor base station when the control unit 302 functions as the terminal. The control unit 302 monitors various portions of the relay nodes and controls the relay node 300 when the control unit 302 functions as the terminal.

The control unit 302 performs call processing between the control unit 302 and the user terminal $400_m$ when the control unit 302 functions as the base station. The control unit 302 performs a resource control at the time of performing the function of the base station. The control unit 302 administrates a connection between the relay node 300 and the user terminal $400_m$ when the control unit 302 functions as the base station. The control unit 302 performs a handover control of the user terminal connected to the relay node 300 when the control unit 302 functions as the base station. The control unit 106 monitors various portions of the relay nodes 300 and controls the relay node 300 when the control unit 302 functions as the base station.

<Function of the Relay Node 300>

Figure 16:
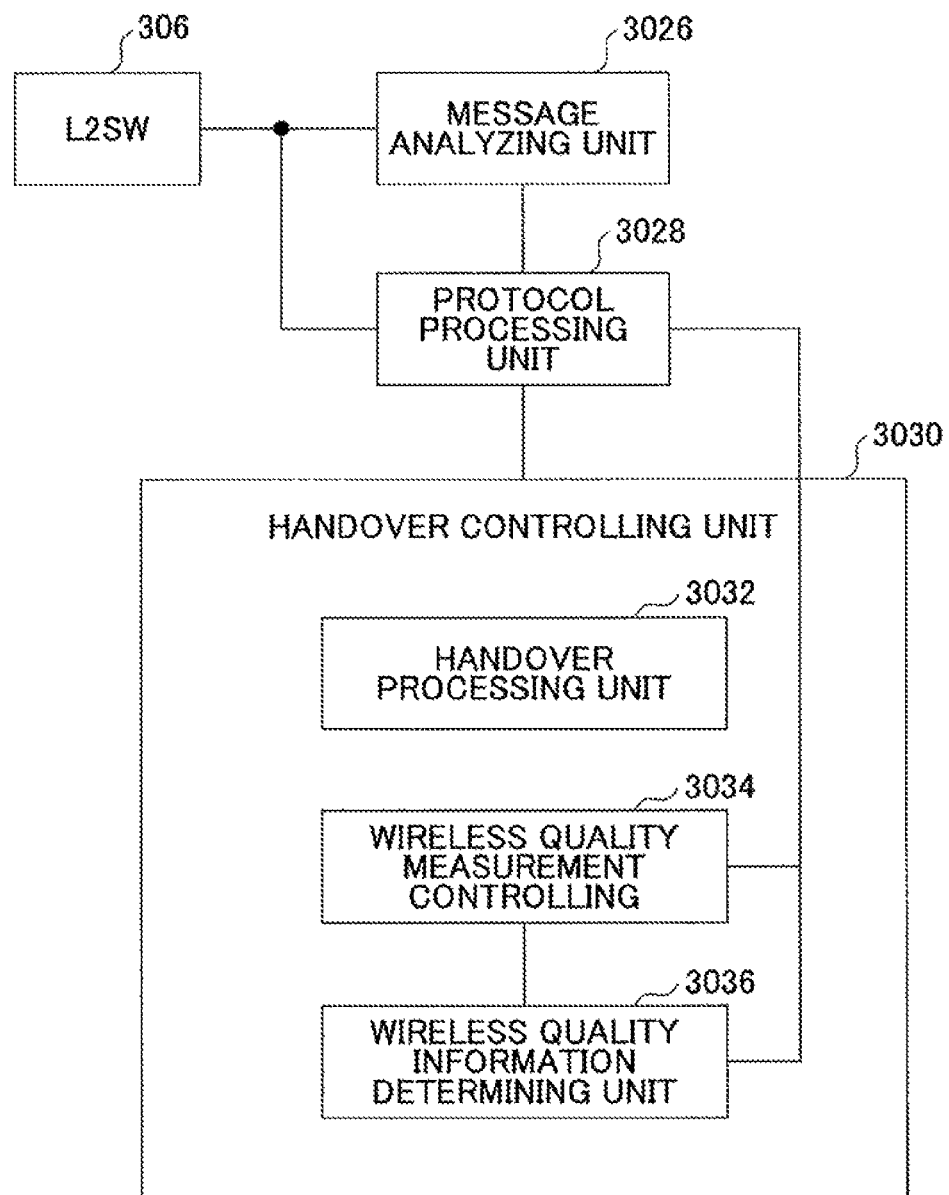
FIG. 16 is a functional block chart of the example of the relay node of the embodiment.

FIG. 16 illustrates an exemplary relay node 300 of the embodiment.

The base station 300 includes a message analyzing unit 3026, a protocol processing unit 3028 and a handover controlling unit 3030. The function of the message analyzing unit 3026, the function of the protocol processing unit 3028 and the function of the handover controlling unit 3030 are realized by the CPU 3022. When the CPU 3022 works in conformity with a predetermined program, the CPU 3026 functions as the message analyzing unit 3028, the protocol processing unit 3028 and the handover controlling unit 3030. The handover controlling unit 3030 includes a handover processing unit 3032, a wireless quality measurement controlling unit 3034 and a wireless quality information determining unit 3036. The function of the handover processing unit 3032, the function of the wireless quality measurement controlling unit 3034 and the function of the wireless quality information determining unit 3036 are realized by the CPU 3022. When the CPU 3022 is operated by the predetermined program, the CPU 3022 functions as the handover processing unit 3032, the wireless quality measurement controlling unit 3034 and the wireless quality information determining unit 3036.

The message analyzing unit 3026 is connected to the L2SW 306. The message analyzing unit 3026 analyzes a message received from the L2SW 306. Specifically, the message analyzing unit 3026 sends the message to the L2SW 306 if the destination of the message is the user terminal $400_m$. Further, the message analyzing unit 3026 sends the message to the protocol processing unit 3028 if the message contains information indicative of a wireless quality in downlink from the user terminal $400_m$, a neighbour cell list from the donor base, or a station wireless quality measurement requesting signal. The wireless quality measurement requesting signal will be described later in detail.

The protocol processing unit 3028 is connected to the L2SW 306 and the message analyzing unit 3026. The protocol processing unit 3028 sends information indicative of the wireless quality in downlink from the message analyzing unit 3026 to the handover controlling unit 3030. Further, the protocol processing unit 3028 makes the handover controlling unit 3030 input the neighbour cell list changing information from the message analyzing unit 3026 and the wireless quality measurement requesting signal.

The handover controlling unit 3030 controls the handover of the user terminal $400_m$ belonging to the relay node 300 to the donor base station, the base station or a relay node other than this relay node. Further, the handover controlling unit 3030 controls handover of the user terminal $400_m$ from the donor base station, the base stations or the other relay node 300 to this relay node 300.

The handover processing unit 3032 is connected to the protocol processing unit 3028. The handover processing unit 3032 determines whether the user terminal $400_m$, which has sent information indicative of the wireless quality in downlink, is handed over to the donor base station, the base station 200 or the other relay node base on the wireless quality in downlink to be input by the protocol processing unit 3028.

The handover processing unit 3032 processes to hand over the user terminal $400_m$ with the donor base station, the base station or the other relay node.

The wireless quality measurement controlling unit 3034 is connected to the protocol processing unit 3028. When the relay node 300 is handed over from the donor base station in which the relay node 300 exists to another donor base station, a wireless quality measurement requesting signal to be sent by the donor base station to which the cell at the handover destination belongs is input in the wireless quality measurement controlling unit 3034. The wireless quality measurement controlling unit 3034 controls measurement of the wireless qualities of cells contained in a neighbour cell list contained in a wireless quality measurement requesting signal. The wireless quality measurement controlling unit 3034 inputs information indicative of the wireless quality of the cells contained in the neighbor cell list to the wireless quality information determining unit 3036.

The wireless quality information determining unit 3036 is connected to the wireless quality measurement controlling unit 3034 and the protocol processing unit 3028. The wireless quality information determining unit 3036 determines whether the cells need to be registered in the neighbour cell list based on the wireless qualities of the cells contained in the neighbour cell list input from the wireless quality measurement controlling unit 3034. Specifically, if the wireless quality is a threshold value or stronger (greater), it is determined that the cells belonging to the relay node are registered in the neighbour cell list. If the wireless quality is weaker (smaller) than the threshold value, it is determined that the cells belonging to the relay node are deleted from the neighbour cell list. The threshold value may be set based on a probability of handover of the relay node 300. Said differently, the threshold value may be set depending on a stronger wireless quality as the probability of handover of the relay node is higher. The wireless quality information determining unit 3036 reports a measurement result, which includes information indicative of whether the cells belonging to the relay node are registered in the neighbour cell list, to the donor base station to which the cell at the handover destination belongs.

Universal Subscriber Identity Module (USIM) 304 is connected to the control unit 302. The USIM 304 stores International Mobile Subscriber Identity (IMSI).

The L2SW 306 is connected to the control unit 302. The L2SW 306 determines a forwarding destination of a packet from the baseband processing unit 308. The L2SW 306 transfers a packet from the baseband processing unit 308 to the I/O port 310 included in the wireless interface 318.

The baseband processing unit 308 is connected to the L2SW 306. Referring to FIG. 5, the baseband processing unit 308 includes a digital signal processor (DSP) 3082 and a memory (MEM) 3082.

The DSP 3082 performs various controls in conformity with a program stored in the MEM 3084. A program for functioning the relay node 300 is stored in the MEM 3084.

The baseband processing unit 308 sends and receives information to and from the L2SW 306. The baseband processing unit 308 has functions of a terminal and a base station.

The baseband processing unit 308 sends and receives information to and from the control unit 302 when the baseband processing unit 308 functions as the terminal. The baseband processing unit 308 monitors traffic and conditions of cells when the baseband processing unit 308 functions as the terminal. The baseband processing unit 308 controls searching of the cells when the baseband processing unit 308 functions as the terminal. The baseband processing unit 308 conceals and releases when the baseband processing unit 308 functions as the terminal. The baseband processing unit 308 performs MAC multiplexing and demultiplexing when the baseband processing unit 308 functions as the terminal. The baseband processing unit 308 performs synchronous processing when the baseband processing unit 308 functions as the terminal.

The baseband processing unit 308 sends and receives information to and from the control unit 302 when the baseband processing unit 308 functions as the base station. The baseband processing unit 308 administrates traffic when the baseband processing unit 308 functions as the base station. Specifically, GTP is administrated. The baseband processing unit 308 performs a traffic transfer when the baseband processing unit 308 functions as the base station. Specifically, GTP performs a transferring process. The baseband processing unit 308 monitors the traffic and the conditions of the cells when the baseband processing unit 308 functions as the base station. The baseband processing unit 308 conceals and releases when the base band processing unit performs the function as the base station. The baseband processing unit 308 performs MAC multiplexing and demultiplexing when the baseband processing unit 308 functions as the terminal. The baseband processing unit 308 performs synchronous processing at the time of performing the function as the base station. The baseband processing unit 308 performs paging processing at the time of performing the function as the base station.

The wireless interface 318 is connected to the L2SW 306.

The I/O ports 310 is connected to the L2SW 306. The I/O port 310 is an input and output port.

The A/D conversion circuit 312 is connected to the I/O port 310. The A/D conversion circuit 312 converts an analog signal received from the I/O port 310 to a digital signal.

The broadband amplifier (broadband AMP) 314 is connected to the A/D conversion circuit 312. The broadband AMP 314 amplifies the digital signal from the A/D conversion circuit 312.

The antennas 316 is connected to the broadband AMP 314. The antennas 316 wirelessly sends a signal from the broadband AMP 314. A wireless signal from the antenna 316 is sent to the user terminal $400_m$ existing in the corresponding cell.

<First Operation of Wireless Communication System>

Figure 17:
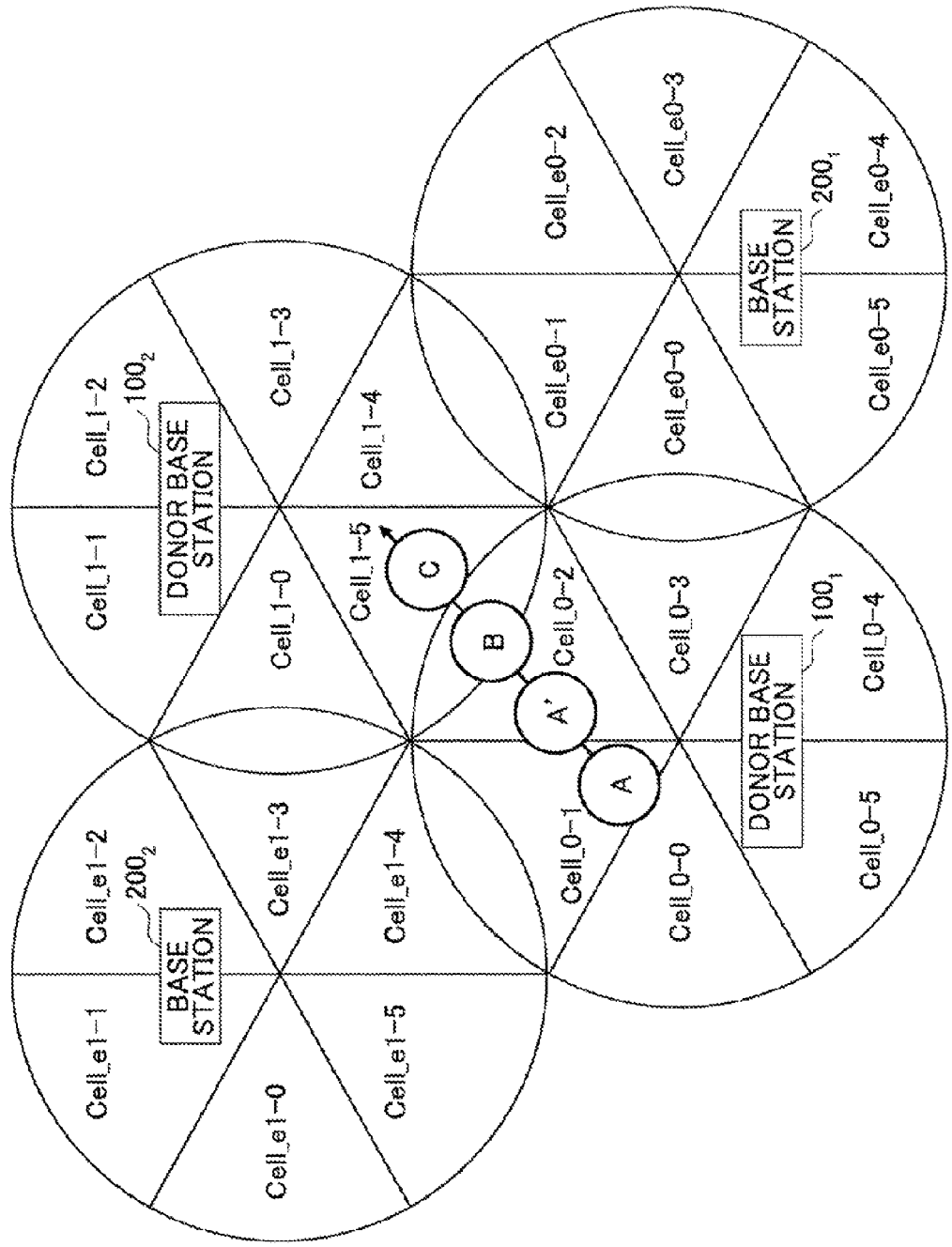
FIG. 17 illustrates another exemplary handover of the relay node of the embodiment.

FIG. 17 illustrates an operation of a wireless communication system;

Referring to FIG. 17, the relay node 300 is handed over from Cell_0-1 at the region A belonging to the donor base station $100_1$ via an edge, i.e., the region A', of Cell_0-2 belonging to the donor base station $100_1$ to a center, i.e., the region B, of Cell_0-2 belonging to the donor base station $100_1$.

Further, the relay node 300 is handed over from the center, i.e. the region B, of Cell_0-2 belonging to the donor base station $100_1$ to Cell_1-5 at the region C belonging to the donor base station $100_1$.

In a neighbour cell list corresponding to Cell_0-2 belonging to the donor base station $100_1$ on the target side at the handover destination from Cell_0-1 at the region A belonging to the donor base station $100_1$, the following information is included.

Hereinafter, "Self DeNB" designates the donor base station $100_1$; "DeNB#1" designates the donor base station $100_2$;

"eNB#0" designates the base station $200_1$; "eNB#1" designates the base station $200_2$; and "Relay" designates the relay node 300.

List Name:
DeNB#0_Ncell_list#0-2
Cell Indicate: Cell_0-2
Self DeNB Ncell: Cell_0-0, Cell_0-1, Cell_0-3, Cell_0-4, Cell_0-5
DeNB#1 Ncell: Cell_1-0, Cell_1-4, Cell_1-5
eNB#0 Ncell: Cell_e0-0, Cell_e0-1
eNB#1 Ncell: Cell_e1-3, Cell_e1-4
Relay Ncell: Cell_r0

In a neighbour cell list corresponding to Cell_1-5 belonging to the donor base station $100_2$ on the target side at the handover destination from Cell_0-2 at the region B belonging to the donor base station $100_1$, the following information is included.

Hereinafter, "Self DeNB" designates the donor base station $100_2$; "DeNB#0" designates the donor base station $100_1$; "eNB#0" designates the base station $200_1$; "eNB#1" designates the base station $200_2$; and "Relay" designates the relay node 300.

List Name DeNB#1 Ncell_list#1-5
Cell Indicate: Cell_1-5
Self DeNB Ncell: Cell_1-0, Cell_1-1, Cell_1-2, Cell_1-3, Cell_1-4
DeNB#0 Ncell: Cell_0-1, Cell_0-2, Cell_0-3
eNB#0 Ncell: Cell_e0-0, Cell_e0-1
eNB#1 Ncell: Cell_e1-3, Cell_e1-4
Relay Ncell: Cell_r0

Figure 18:
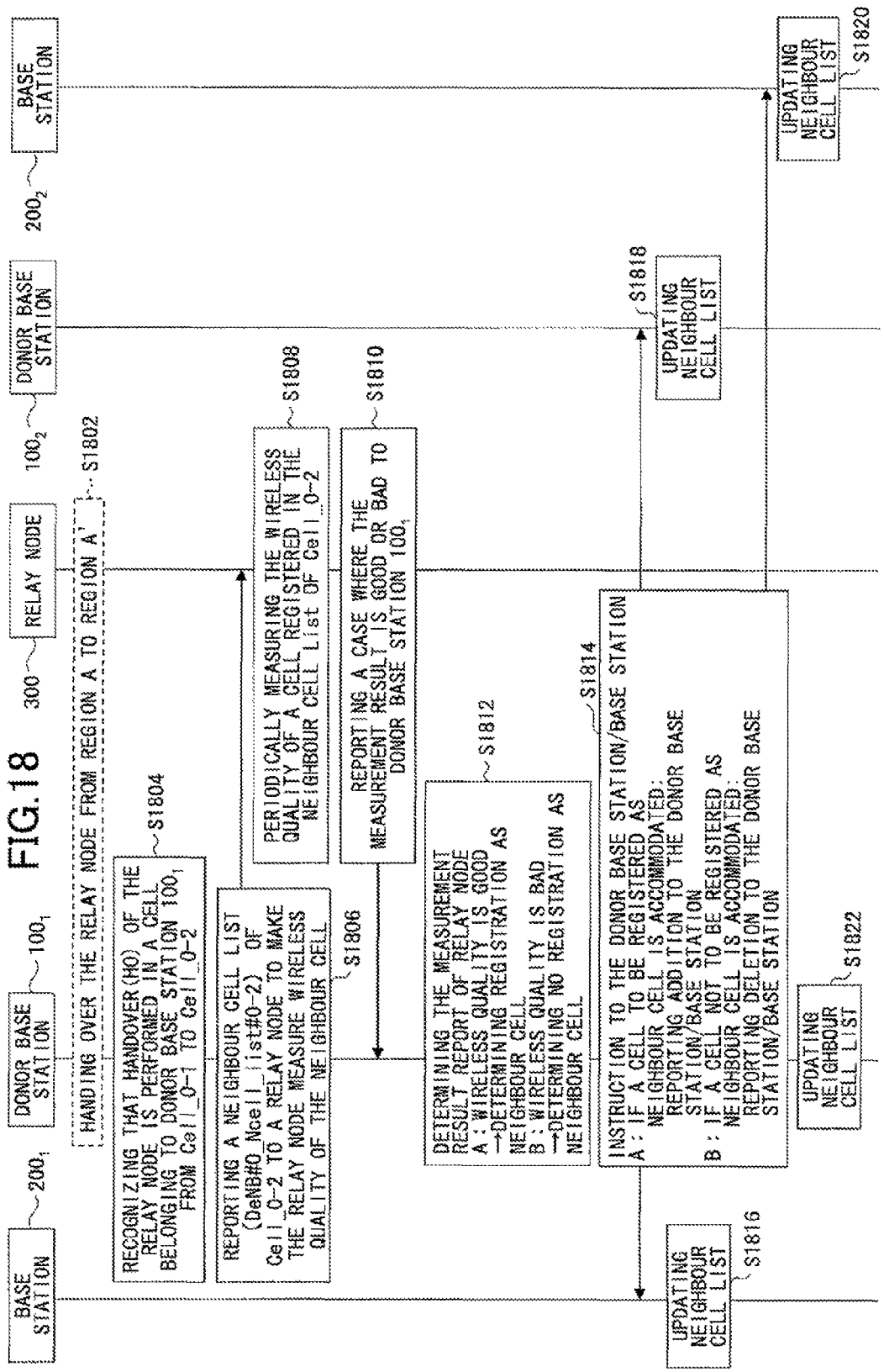
FIG. 18 illustrates a first operation of a wireless communication system of the embodiment.

FIG. 18 illustrates an exemplary operation of the wireless communication system. Referring to FIG. 18, the relay node 300 is handed over from Cell_0-1 belonging to the donor base station $100_1$ to Cell_0-2 belonging to the donor base station $100_1$.

A process of handing the relay node over from the region A to the region A' between the donor base station $100_1$ and the relay node 300 is started in step S1802.

The donor base station $100_1$ recognizes that the relay node 300 is handed over in the cell belonging to the donor base station $100_1$ in step S1804. The CPU 1062 of the donor base station $100_1$ recognizes that the relay node 300 is handed over in the cell belonging to the donor base station $100_1$. Said differently, the CPU 1062 of the donor base station $100_1$ recognizes that the relay node 300 is handed over from Cell_0-1 belonging to the donor base station $100_1$ to Cell_0-2 belonging to the donor base station $100_1$.

The donor base station $100_1$ reports a wireless quality measurement requesting signal including a neighbour cell list corresponding to Cell_0-2 at the handover destination to the relay node 300 in step S1806. The CPU 1062 of the donor base station $100_1$ reports the wireless quality measurement requesting signal including a neighbour cell list corresponding to Cell_0-2 at the handover destination to the relay node 300. By reporting the wireless quality measurement requesting signal, it is possible to make the relay node 300 measure the wireless quality of a neighbour cell adjacent to the cell at the handover destination.

The relay node 300 periodically measures the wireless quality of the cell registered in the neighbour cell contained in the wireless quality measurement requesting signal based on the wireless quality measurement requesting signal from the donor base station $100_1$ in step S1808. The CPU 3022 of the relay node 300 periodically measures the wireless quality of the cell registered in the neighbour cell contained in the wireless quality measurement requesting signal based on the wireless quality measurement requesting signal from the donor base station $100_1$.

The relay node 300 determines whether the wireless quality is the same as or stronger (higher) than a threshold value and reports the result of the determination to the donor base station $100_1$ in step S1810. The CPU 3022 of the relay node 300 determines whether the wireless quality is the same as or stronger (higher) than the threshold value and reports the result of the determination to the donor base station $100_1$. The measurement result may contain information indicative of the cells and information indicating whether the wireless qualities of the cells are the same as or stronger (higher) than the threshold value.

The donor base station $100_1$ determines that the relay node 300 is registered in the neighbour cell list corresponding to the cell whose wireless quality is determined to be the same as or stronger (higher) than the threshold value based on the determination result received from the relay node 300. Said differently, the CPU 1062 of the donor base station $100_1$ determines that the relay node 300 is registered in the neighbour cell list corresponding to the cell whose wireless quality is determined to be the same as or stronger (higher) than the threshold value based on the determination result received from the relay node 300. Further, the donor base station $100_1$ determines that the relay node 300 is deleted from the neighbour cell list corresponding to the cell whose wireless quality is determined to be weaker (lower) than the threshold value based on the determination result received from the relay node 300 in step S1812. Said differently, the CPU 1062 of the donor base station $100_1$ determines that the relay node 300 is deleted from the neighbour cell list corresponding to the cell whose wireless quality is determined to be weaker (lower) than the threshold value based on the determination result received from the relay node 300.

The donor base station $100_1$ instructs the donor base station $100_2$ and the base stations $200_1$ and $200_2$, to which neighbour cells adjacent to Cell_0-2 at the handover destination belong, to update the neighbour cell list in step S1814. Said differently, the CPU 1062 of the donor base station $100_1$ instructs the donor base station $100_2$ and the base stations $200_1$ and $200_2$, to which the neighbour cells adjacent to Cell_0-2 at the handover destination belong, to update the neighbour cell list. Specifically, neighbour cell list changing information of instructing the donor base station $100_2$ and the base stations $200_1$ and $200_2$, to which the cells determined in step S1812 to have the wireless quality the same as or stronger (higher) than the threshold value belong, to register the relay node in the neighbour cell list, and of instructing the donor base station $100_2$ and the base stations $200_1$ and $200_2$, to which the cells determined in step S1812 to have the wireless quality weaker (lower) than the threshold value belong, to delete the relay node from the neighbour cell list.

The donor base station $100_2$ and the base stations $200_1$ and $200_2$ update the neighbour cell list in conformity with the neighbour cell list changing information received from the donor base station $100_1$ in steps S1816, S1818 and S1820. The CPU 1062 of the donor base station $100_2$, the CPU 2062 of the base station $200_1$ and the CPU 2062 of the base station $200_2$ update the neighbour cell list in conformity with the neighbour cell list changing information received from the donor base station $100_1$.

In step S1822, the donor base station $100_1$ updates the neighbour cell list in conformity with the result of the determination obtained. The CPU 1062 of the donor base station $100_1$ updates the neighbour cell list in conformity with the result of the determination obtained in step S1812.

<Second Operation of the Wireless Communication System>

Figure 19:
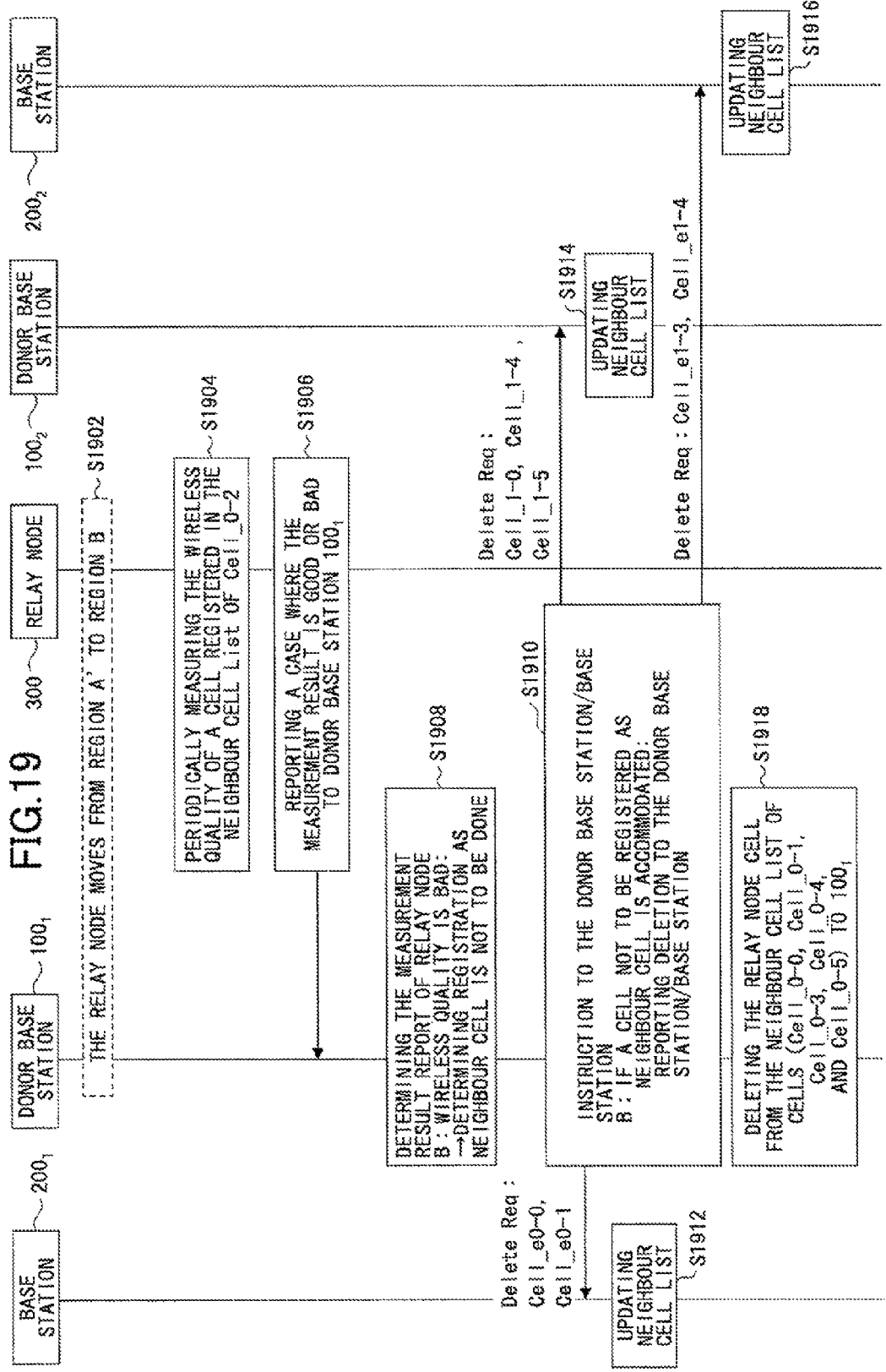
FIG. 19 illustrates a second operation of the wireless communication system of the embodiment.

Referring to FIG. 19, the relay node 300 is handed over from the edge of Cell_0-2 belonging to the donor base station $100_1$ to Cell_0-2 belonging to the donor base station $100_1$. In this case, since the cell is moved in the same cell, the hand over is not performed.

The relay node 300 moves from the region A' to the region B in step S1902.

The relay node 300 periodically measures the wireless quality of a cell registered in the neighbour cell list corresponding to Cell_0-2 belonging to the donor base station $100_1$, in which the relay node 300 exists, in step S1904. Said differently, the CPU 3022 of the relay node 300 periodically measures the wireless quality of the cell registered in the neighbour cell list corresponding to Cell_0-2 belonging to the donor base station $100_1$, in which the relay node 300 exists.

The relay node 300 determines whether the wireless quality measured in step S1904 is the same as or stronger (higher) than a threshold value and reports the result of the determination to the donor base station $100_1$ in step S1906. Said differently, the CPU 3022 of the relay node 300 determines whether the wireless quality is the same as or stronger (higher) than the threshold value and reports the result of the determination to the donor base station $100_1$. In this case, because the relay node 300 is already moved to a central region of Cell_0-2 belonging to the donor base station $100_1$ in which the relay node exists, only the case where the measured wireless quality is weaker (lower) than the threshold value may be reported. Because the relay node 300 is moved to the central region of Cell_0-2, it is assumed that the receiving quality of the Cell_0-2 is good but the receiving quality of neighbour cells adjacent to Cell_0-2 is bad. Specifically, the following cell is reported as the cell having the bad wireless quality.

"Self DeNB" designates the donor base station $100_1$, "DeNB#1" also designates the donor base station $100_1$, "eNB#0" designates the base station $200_1$ and "eNB#1" designates the base station $200_2$.

List Name:
DeNB#0 Ncell_list#0-2
Cell Indicate: Cell_0-2
Self DeNB Ncell: Cell_0-0, Cell_0-1, Cell_0-3, Cell_0-4, Cell_0-5
DeNB#1 Ncell: Cell_1-0, Cell_1-4, Cell_1-5
eNB#0 Ncell: Cell_e0-0, Cell_e0-1

The donor base station $100_1$ determines that the relay node 300 is not registered in the neighbour cell list corresponding to the cell whose wireless quality is determined to be weaker (lower) than the threshold value based on the determination result received from the relay node 300 in step S1908. Said differently, the CPU 1062 of the donor base station $100_1$ determines that the relay node 300 is not registered in the neighbour cell list corresponding to the cell whose wireless quality is determined to be weaker (lower) than the threshold value based on the determination result received from the relay node 300.

The donor base station $100_1$ instructs the donor base station $100_2$ and the base stations $200_1$ and $200_2$, to which the neighbour cells adjacent to Cell_0-2 belong, to update the neighbour cell list in step S1910. Said differently, the CPU 1062 of the donor base station $100_1$ instructs the donor base station $100_2$ and the base stations $200_1$ and $200_2$, to which the neighbour cells adjacent to Cell_0-2 belong, to update the neighbour cell list. Specifically, the neighbour cell list changing information containing the information of instructing to delete the relay node from the neighbour cell list is sent to the donor base station $100_1$ instructs the donor base station $100_2$ and the base stations $200_1$ and $200_2$, to which the cell whose wireless quality is determined to be bad in step S1908. Said differently, it is instructed to the base station $200_1$ to delete the cell belonging to the relay node 300 from the neighbour cell lists of Cell_e0-0 and Cell_e0-1, which belong to the base station $200_1$. Further, it is instructed to the base station $200_2$ to delete the cell belonging to the relay node 300 from the neighbour cell lists of Cell_e1-3 and Cell_e1-4, which belong to the base station $200_2$. Further, it is instructed to the donor base station $100_2$ to delete the cell belonging to the relay node 300 from the neighbour cell lists of Cell_1-0, Cell_1-4 and Cell_1-5, which belong to the base station $100_2$.

The donor base station $100_2$ and the base stations $200_1$ and $200_2$ update the neighbour cell list in conformity with the neighbour cell list changing information received from the donor base station $100_1$ in steps S1912, S1914 and S1916. Said differently, the CPU 1062 of the donor base station $100_2$, the CPU 2062 of the base station $200_1$ and the CPU 2062 of the base station $200_2$ update the neighbour cell list in conformity with the neighbour cell list changing information received from the donor base station $100_1$.

In step S1918, the donor base station $100_1$ updates the neighbour cell list in conformity with the result of the determination obtained in step S1908. The CPU 1062 of the donor base station $100_1$ updates the neighbour cell list in conformity with the result of the determination obtained in step S1908. Specifically, the donor base station $100_1$ deletes the cell belonging to the donor base station $100_1$ from the neighbour cell lists of Cell_0-0, Cell_0-1, Cell_0-3, Cell_0-4 and Cell_0-5, which belong to the donor base station $100_1$.

<Third Operation of the Wireless Communication System>

Figure 20:
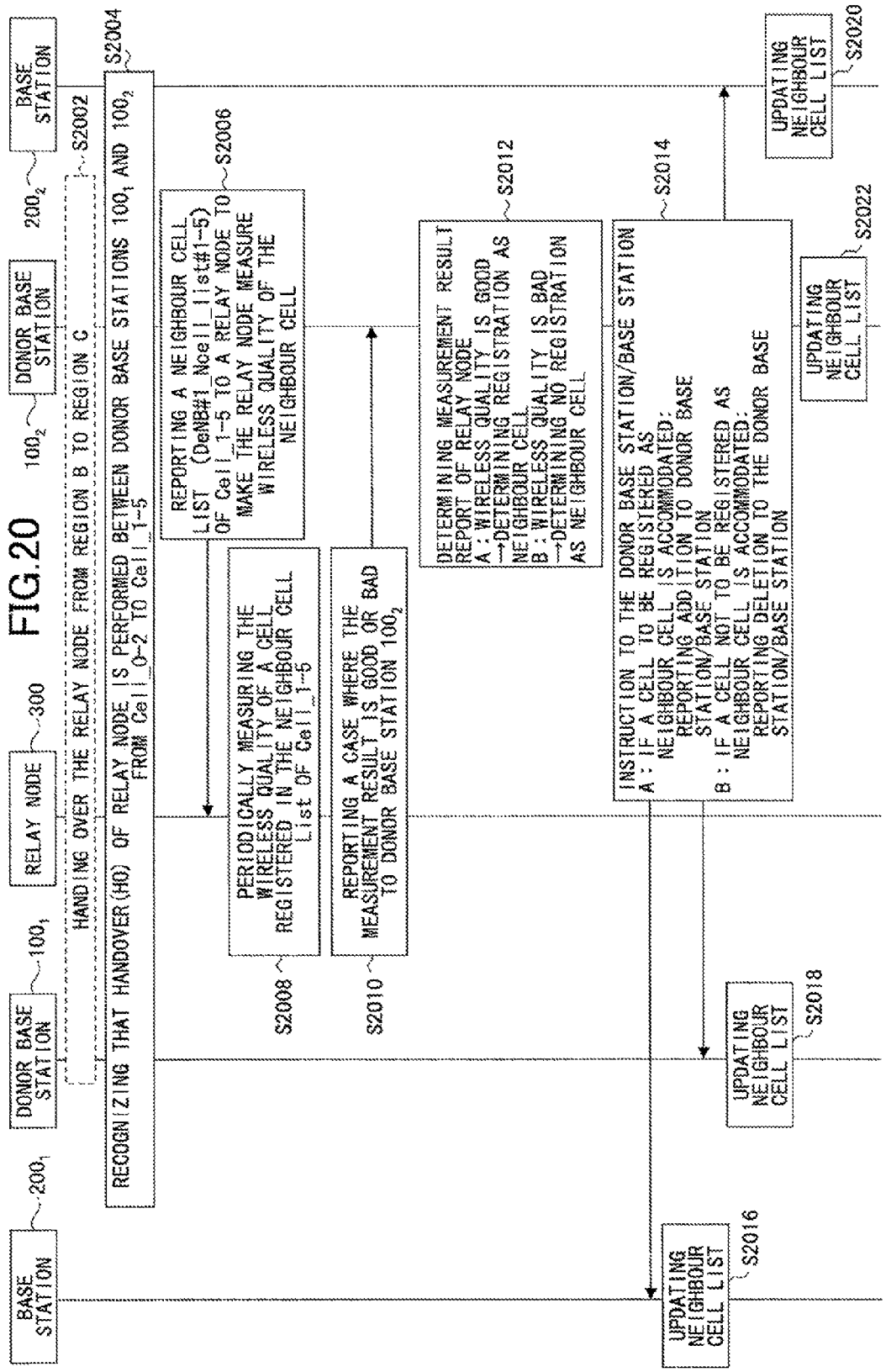
FIG. 20 illustrates a third operation of the wireless communication system of the embodiment.

FIG. 20 illustrates another exemplary operation of the wireless communication system. Referring to FIG. 20, the relay node 300 is handed over from Cell_0-2 belonging to the donor base station $100_1$ to Cell_1-5 belonging to the donor base station $100_2$.

A process of handing the relay node 300 over from the region B of the donor base station $100_1$ to the region C of the donor base station $100_2$ is started in step S2002.

The donor base stations $100_1$ and $100_2$ recognize that the relay node 300 is handed over between the donor base stations $100_1$ and $100_2$ in step S2004. The CPU 1062 of the donor base station $100_1$ and the CPU 1062 of the donor base station $100_2$ recognize that the relay node 300 is handed over between the donor base stations $100_1$ and $100_2$. Said differently, the donor base station $100_1$ recognizes that the relay node 300 is handed over from Cell_0-2 belonging to the donor base station $100_1$ to Cell_1-5 belonging to the donor base station $100_2$.

The donor base station $100_2$, to which Cell_1-5 at the handover destination belongs, reports a wireless quality measurement requesting signal containing the neighbour cell list corresponding to Cell_1-5 at the handover destination to the relay node 300 in step S2006. Said differently, the CPU 1062 of the donor base station $100_2$, to which Cell_1-5 at the handover destination belongs, reports the wireless quality measurement requesting signal containing the neighbour cell list corresponding to Cell_1-5 at the handover destination to the relay node 300. By reporting the wireless quality measurement requesting signal, it is possible to make the relay node 300 measure the wireless quality of a cell contained in the neighbour cell list corresponding to the cell at the handover destination.

The relay node 300 periodically measures the wireless quality of the cell registered in the neighbour cell contained in the wireless quality measurement requesting signal based on the wireless quality measurement requesting signal from the donor base station $100_2$ in step S2008. The CPU 3022 of the relay node 300 periodically measures the wireless quality of the cell registered in the neighbour cell contained in the wireless quality measurement requesting signal based on the wireless quality measurement requesting signal from the donor base station 100₂.

The relay node 300 determines whether the wireless quality is the same as or stronger (higher) than a threshold value and reports the result of the determination to the donor base station 100₂ in step S2010. Said differently, the CPU 3022 of the relay node 300 determines whether the wireless quality is the same as or stronger (higher) than the threshold value and reports the result of the determination to the donor base station 100₂. The measurement result may contain information indicative of the cells and information indicating whether the wireless qualities of the cells are stronger (higher) than the threshold value.

The donor base station 100₂ determines that the relay node 300 is registered in the neighbour cell list corresponding to the cell whose wireless quality is determined to be the same as or stronger (higher) than the threshold value based on the measurement result received from the relay node 300. Said differently, the CPU 1062 of the donor base station 100₂ determines that the relay node 300 is registered in the neighbour cell list corresponding to the cell whose wireless quality is determined to be the same or stronger (higher) than the threshold value based on the measurement result received from the relay node 300. The donor base station 1002 determines that the relay node 300 is not registered in the neighbour cell list corresponding to the cell whose wireless quality is determined to be weaker (lower) than the threshold value based on the determination result received from the relay node 300 in step S2012. Said differently, the CPU 1062 of the donor base station 100₂ determines that the relay node 300 is not registered in the neighbour cell list corresponding to the cell whose wireless quality is determined to be weaker (lower) than the threshold value based on the determination result received from the relay node 300.

The donor base station 100₂ instructs the base station 100₁ and the base stations 200₁ and 200₂, to which the neighbour cells adjacent to Cell_1-5 belong, to update the neighbour cell list in step S2014. Said differently, the CPU 1062 of the donor base station 100₂ instructs the base station 100₁ and the base stations 200₁ and 200₂, to which the neighbour cells adjacent to Cell_1-5 belong, to update the neighbour cell list. Specifically, neighbour cell list changing information of instructing the donor base station 100₁ and the base stations 200₁ and 200₂, to which the cells determined in step S2012 to have the wireless quality the same as or stronger (higher) than the threshold value belong, to register the cell belonging to the relay node in the neighbour cell list, and of instructing the donor base station 2012 and the base stations 200₁ and 200₂, to which the cells determined in step S1812 to have the wireless quality weaker (lower) than the threshold value belong, to delete the cell belonging to the relay node from the neighbour cell list.

The donor base station 100₁ and the base stations 200₁ and 200₂ update the neighbour cell list in conformity with the neighbour cell list changing information received from the donor base station 100₁ in steps S2016, S2018 and S2020. The CPU 1062 of the donor base station 100₁, the CPU 2062 of the base station 200₁ and the CPU 2062 of the base station 200₂ update the neighbour cell list in conformity with the neighbour cell list changing information received from the donor base station 100₁.

In step S2022, the donor base station 100₂ updates the neighbour cell list in conformity with the measurement result obtained in step S1908. The CPU 1062 of the donor base station 100₂ updates the neighbour cell list in conformity with the measurement result obtained in step S2012.

Within the first embodiment, it is possible to prevent the cell belonging to the relay node from being registered in the neighbour cell list of another cell of which probability of being a neighbour cell adjacent to the cell belonging to the relay node is lower when the relay node is handed over, and the cell belonging to the relay node can be registered in the neighbour cell list of another cell of which probability of being a neighbour cell adjacent to the cell belonging to the relay node is higher when the relay node is handed over, Therefore, it is possible to optimize the cells contained in the neighbour cell list by registering or not registering the cell belonging to the relay node. Thus, processing loads on the donor base station and the base station can be reduced.

Second Embodiment

In comparison with the first embodiment, the number of the cells contained in the neighbour cell list reported to the relay node from the donor base station, to which the cell at the handover destination belongs, may be reduced in advance.

In order to decrease the number of cells contained in the neighbour cell list reported to the relay node 300 from the donor base station, to which the cell at the handover destination belongs, the following process may be performed before the first embodiment.

Figure 21:
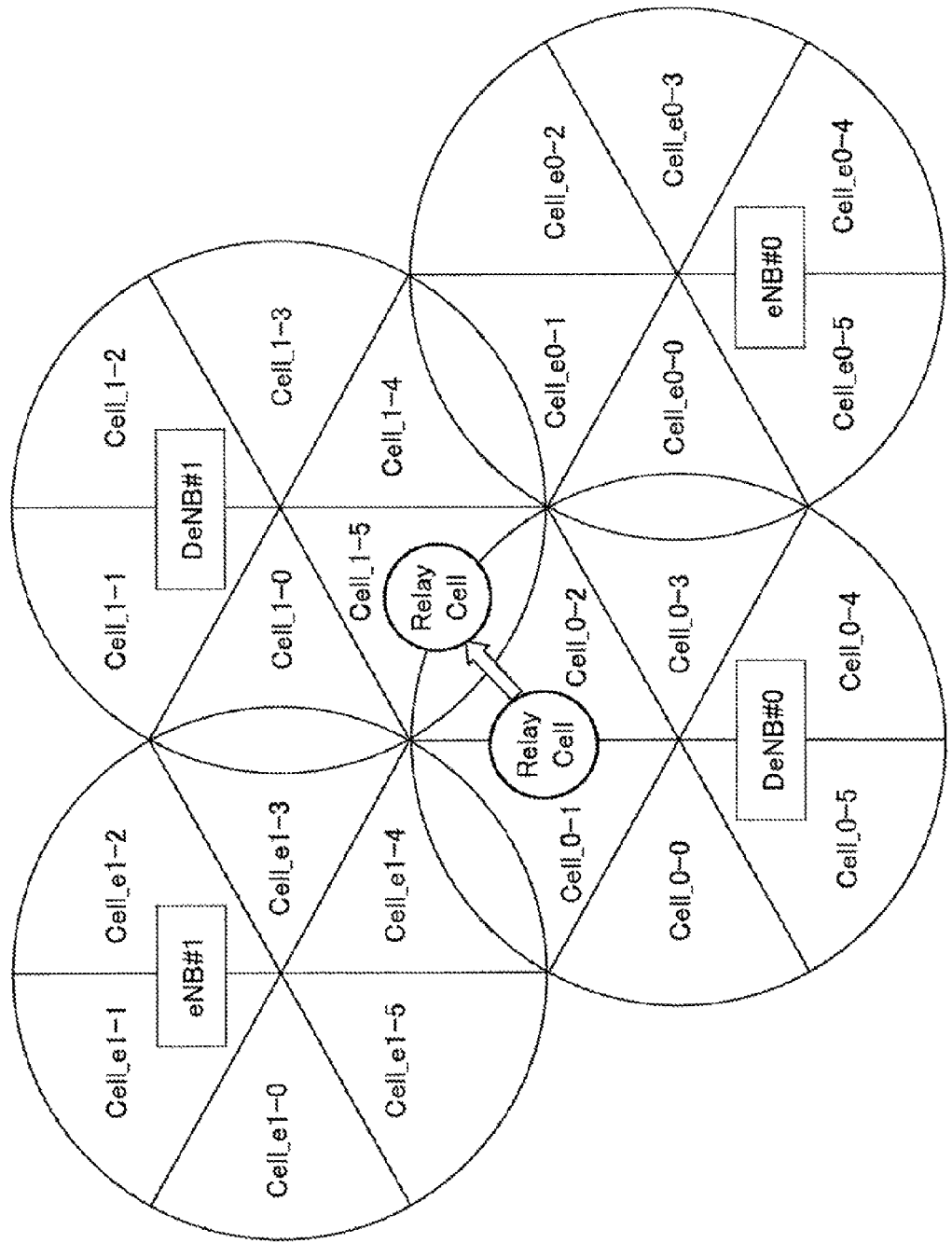
FIG. 21 illustrates an exemplary handover of the relay node of the embodiment.

FIG. 21 illustrates detailed processes of adding information indicative of a cell belonging to a relay node to a neighbour cell list or deleting the information from the neighbour cell list along with a movement of the relay node.

Referring to FIG. 21, Relay Cell belonging to the relay node moves from a region covered by Cell_0-2 belonging to a donor base station DeNB#0 to a region covered by Cell_1-5 belonging to a donor base station DeNB#1. Said differently, the relay node is handed over from Cell_0-2 belonging to the donor base station DeNB#0 to Cell_1-5 belonging to the donor base station DeNB#1.

When the relay node is handed over from Cell_0-2 belonging to the donor base station DeNB#0 to Cell_1-5 belonging to the donor base station DeNB#1, DeNB#0 at the handover source of the relay node reports to a donor base station and a base station accommodating the cells contained in the neighbour cell list of Cell_0-2 belonging to the donor base station at the handover source of the relay node so as to delete the cell belonging to the relay node from the neighbour cell lists.

Further, DeNB#1 at the handover destination of the relay node reports to donor base stations and base stations accommodating the cells contained in the neighbour cell list of Cell_1-5 belonging to the donor base station at the handover destination of the relay node so as to add information of adding the cell belonging to the relay node to the neighbour cell list.

The process of deleting the information indicative of the cell belonging to the relay node from the above neighbour cell list and the process of adding the information indicative of the cell belonging to the relay node are assumedly performed also to cells adjacent to both of the cells at the handover source and the handover destination of the relay node. In this case, the donor base station and the base station accommodating the cell adjacent to both of the cells at the handover source and the handover destination of the relay node is reported to delete the information indicative of the cell belonging to the relay node after being reported to delete the information indicative of the cell belonging to the relay node from the neighbour cell list.

After deleting the cell belonging to the relay node, the process of adding the information indicative of the cell belonging to the relay node may not be performed.

Within the second embodiment, this excessive process is deleted.

<Wireless Communication System>

An exemplary wireless communication system of the second embodiment is substantially similar to the example described with reference to FIG. 4.

<Donor Base Station $100_n$>

The exemplary donor base station is substantially similar to the donor base station described with reference to FIG. 5.

<Function of Donor Base Station $100_n$>

Figure 22:
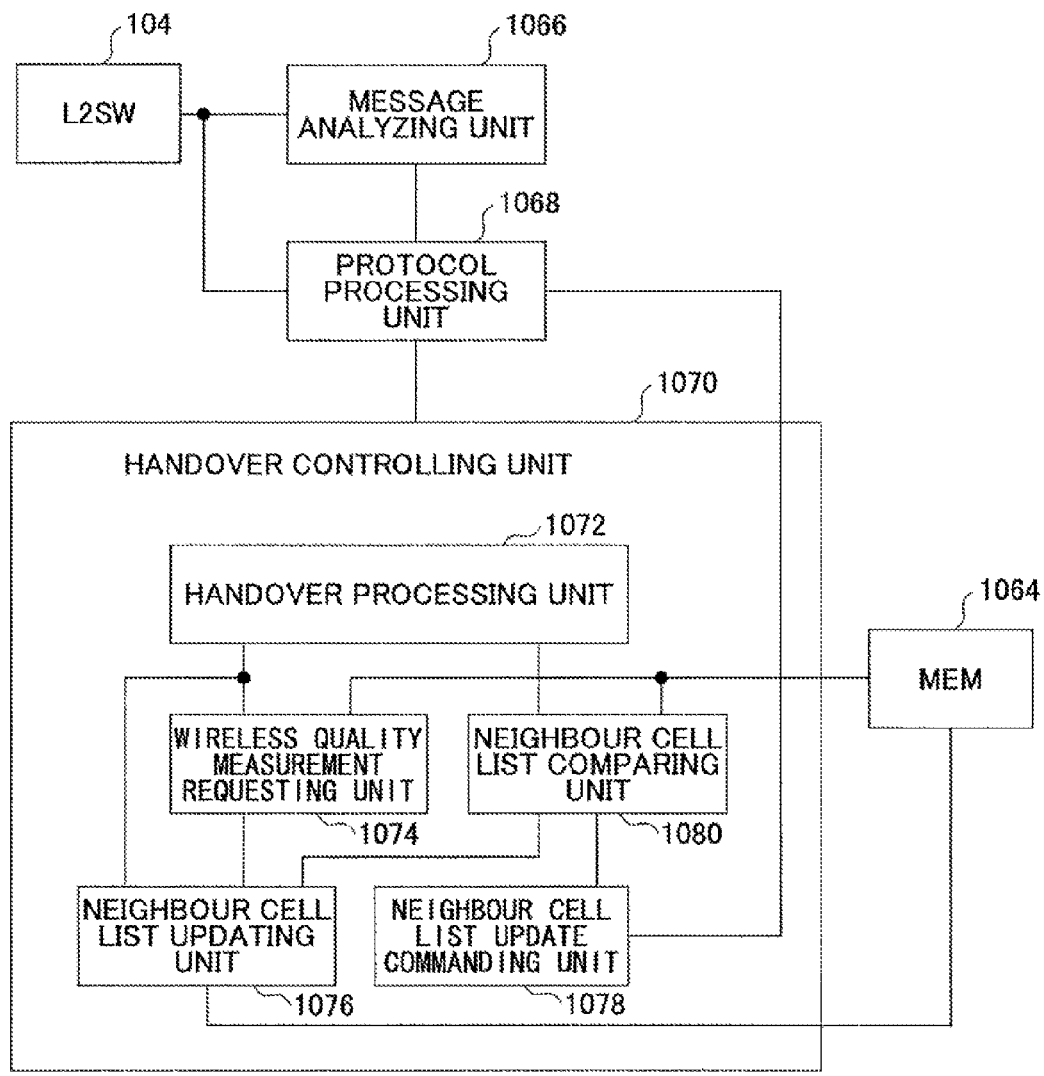
FIG. 22 is a functional block chart of an exemplary donor base station of the embodiment.

FIG. 22 illustrates an example of the donor base station $100_n$ of the second embodiment.

Referring to FIG. 22, a neighbour cell list comparing unit 1080 is added to the donor base station $100_n$ described with reference to FIG. 6. The function of the neighbour cell list comparing unit 1080 is realized by the CPU 1062. When the CPU 1062 is operated by a predetermined program, the CPU 1062 functions as the neighbour cell list comparing unit 1080.

When a message to be input from the L2SW 104 is a neighbour cell list received from another donor base station, the message analyzing unit 1066 inputs the neighbour cell list to the protocol processing unit 1068. The neighbour cell list is substantially the same as the neighbor cell list illustrated in FIG. 7. The protocol processing unit 1068 makes the handover controlling unit 1070 input the neighbour cell list received from the message analyzing unit 1066. Further, the protocol processing unit 1068 performs protocol conversion for sending the neighbour cell list to be reported to the relay node 300 belonging to the donor base station at the handover destination. The neighbour cell list is included in an X2 message.

The handover processing unit 1072 processes to hand over the relay node 300 to and from the other donor base station. The handover processing unit 1072 reports that the handover is performed to the neighbour cell list comparing unit 1080 at a time of handing over the relay node 300 between the handover processing unit 1072 and another donor base station.

Further, the handover processing unit 1072 sends neighbour cell list update information sent from the other donor base station so that the neighbour cell list updating unit 1076 receives the neighbour cell list update information when the above handover is performed to the neighbour cell list updating unit 1076. The neighbour cell list update information is substantially the same as those illustrated in FIGS. 8 and 9. The neighbour cell list update information illustrated in FIG. 8 is sent mainly by the donor base station at the handover source. The neighbour cell list update information illustrated in FIG. 9 is sent mainly by the donor base station at the handover destination.

The neighbour cell list comparing unit 1080 is connected to the handover processing unit 1072. The neighbour cell list comparing unit 1080 is connected to the handover processing unit 1072 and the memory (MEM) 1064. When the relay node 300 is handed over between the donor base station $100_n$ and another donor base station, the neighbour cell list corresponding to the cell at the handover destination from the other donor base station or the neighbour cell list corresponding to the cell at the at the handover source is input from the handover processing unit 1072 to the neighbour cell list comparing unit 1080. The neighbour cell list comparing unit 1080 compares information indicative of the cell contained in the neighbour cell list of the donor base station 100n stored in the memory (MEM) 1064 and information indicative of the cell contained in the neighbour cell list of the other donor station.

<Case where the Cell at the Handover Source Belongs to the Donor Base Station>

The neighbour cell list corresponding to the cell at the handover destination is input from the donor base station $100_n$ and the other donor base station performing the handover to the neighbour cell list comparing unit 1080. The neighbour cell list comparing unit 1080 extracts information indicative of a cell which does not overlap by comparing the neighbour cell list corresponding to the cell at the handover destination and the neighbour cell list which corresponds to the cell at the handover source of the relay node 300 and is to be stored in the memory (MEM) 1064. Specifically, the information indicative of the cell which does not overlap the cell contained in the neighbour cell list corresponding to the handover destination is extracted from the cells contained in the neighbour cell list which corresponds to the cell at the handover source of the relay node 300 and is to be stored in the memory (MEM) 1064. When the information indicative of the cell at the handover destination is contained in the information indicative of the cell which does not overlap, the information of the cell at the handover destination is deleted from the information indicative of the cell which does not overlap. The neighbour cell list comparing unit 1080 inputs the information indicative of the cell which does not overlap (hereinafter, referred to as "non-overlapping cell information") to the neighbour cell list updating unit 1076 and the neighbour cell list update commanding unit 1078.

<Case where the Cell at the Handover Destination Belongs to the Donor Base Station>

The neighbour cell list corresponding to the cell at the handover destination is input from another donor base station which performs handover with this donor base station $100_n$ to the neighbour cell list comparing unit 1080. The neighbour cell list comparing unit 1080 extracts information indicative of a cell which does not overlap by comparing the neighbour cell list corresponding to the cell at the handover source and the neighbour cell list which corresponds to the cell at the handover destination of the relay node 300 and is to be stored in the memory (MEM) 1064. Specifically, the information indicative of the cell which does not overlap the cell contained in the neighbour cell list corresponding to the handover source is extracted from the cells contained in the neighbour cell list which corresponds to the cell at the handover destination of the relay node 300 and is to be stored in the memory (MEM) 1064. When the information indicative of the cell at the handover source is contained in the information indicative of the cell which does not overlap, the information of the cell at the handover source is deleted from the information indicative of the cell which does not overlap. The neighbour cell list comparing unit 1080 inputs the non-overlapping cell information to the neighbour cell list updating unit 1076 and the neighbour cell list update commanding unit 1078.

The neighbour cell list updating unit 1076 is connected to the memory (MEM) 1064, the handover processing unit 1072, and the wireless quality measurement requesting unit 1080. The neighbour cell list updating unit 1076 updates the neighbour cell list to be stored in the memory (MEM) 1064. The neighbour cell list updating unit 1076 stores the updated neighbour cell list in the memory (MEM) 1064.

<Case where the Donor Base Station Includes the Cell at the Handover Source>

The neighbour cell list updating unit 1076 determines whether the cell belonging to the donor base station is contained in the neighbour cell list update information which is input by the neighbour cell list comparing unit 1080. When the non-overlapping cell information includes a cell belonging to the donor base station, the information indicative of the cell belonging to the relay node 300 is deleted from the neighbour cell information corresponding to the cell belonging to the donor base station contained in the non-overlapping cell information among neighbour cell lists which correspond to the cells and are to be stored in the memory (MEM) 1064.

The neighbour cell list updating unit 1076 determines whether the cell belonging to the donor base station is contained in the neighbour cell list update information which is input by the handover processing unit 1072. When the neighbour cell list update information contains a cell belonging to the donor base station, the information indicative of the cell belonging to the relay node 300 is added to the neighbour cell information corresponding to the cell belonging to the donor base station contained in the neighbour cell list update information among the neighbour cell lists which correspond to the cells and are to be stored in the memory (MEM) 1064.

<Case where the Donor Base Station Includes the Cell at the Handover Destination>

The neighbour cell list updating unit 1076 determines whether the cell belonging to the donor base station is contained in the neighbour cell list update information which is input by the handover processing unit 1072. When the neighbour cell list update information contains a cell belonging to the donor base station, the information indicative of the cell belonging to the relay node 300 is added to the neighbour cell information corresponding to the cell contained in the neighbour cell list update information among the neighbour cell lists which correspond to the cells and are to be stored in the memory (MEM) 1064.

The neighbour cell list updating unit 1076 determines whether the cell belonging to the donor base station is contained in the neighbour cell list update information which is input by the handover processing unit 1072. When the neighbour cell list update information contains a cell belonging to the donor base station, the information indicative of the cell belonging to the relay node 300 is deleted from the neighbour cell information corresponding to the cell belonging to the donor base station contained in the neighbour cell list update information among the neighbour cell lists which correspond to the cells and are to be stored in the memory (MEM) 1064.

The neighbour cell list update commanding unit 1078 is connected to the protocol processing unit 1068 and the neighbour cell list comparing unit 1080. The neighbour cell list update commanding unit 1078 generates the neighbour cell list update information for requesting an update of the neighbour cell list in at least one of a donor base station other than the donor base station and the base station 200 based on the non-overlapping cell information to be input by the neighbour cell list comparing unit 1080. The neighbour cell list update commanding unit 1078 sends the neighbour cell list update information to the protocol processing unit 1068 so that the protocol processing unit 1068 receives the neighbour cell list update information. The protocol processing unit 1068 performs protocol conversion for sending the neighbour cell list update information as an X2 message.

<Case where the Donor Base Station Includes the Cell at the Handover Source>

The neighbour cell list update commanding unit 1078 generates neighbour cell list update information containing information for requesting deletion of information indicative the cell belonging to the relay node from the neighbour cell list of the cell contained in the non-overlapping cell information in at least one of the donor base station and the base station which contain the cell contained in the non-overlapping cell information input by the neighbour cell list comparing unit 1080.

<Case where the Donor Base Station Includes the Cell at the Handover Destination>

The neighbour cell list update commanding unit 1078 generates neighbour cell list update information containing information for requesting addition of information indicative of the cell belonging to the relay node 300 in the neighbour cell list of the cell contained in the non-overlapping cell information in at least one of the donor base station and the base station which contain the cell contained in the non-overlapping cell information input by the neighbour cell list comparing unit 1080.

<First Operation of the Wireless Communication System>

Figure 23:
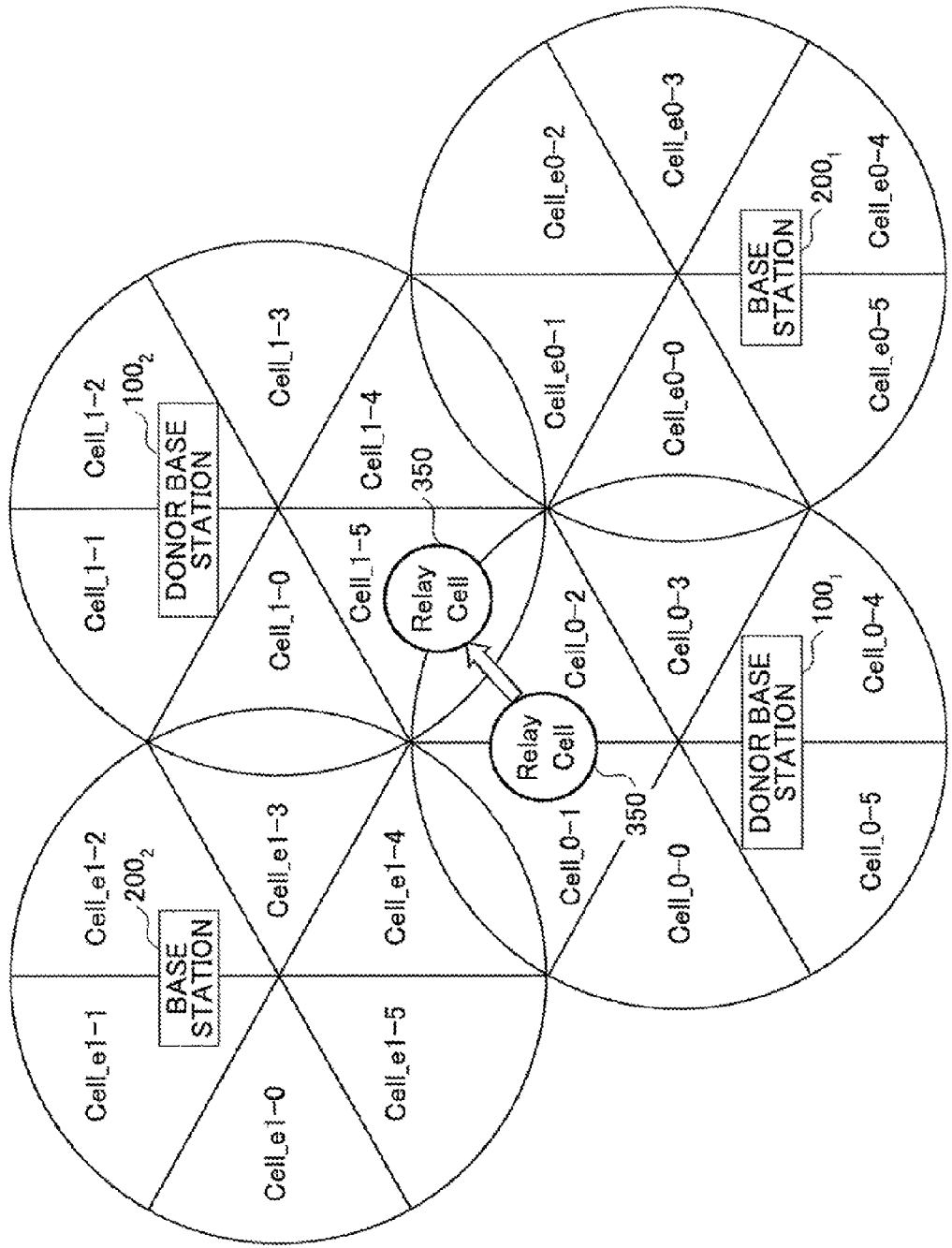
FIG. 23 illustrates another exemplary handover of the relay node of the embodiment.

FIG. 23 illustrates an exemplary operation of the wireless communication system.

Referring to FIG. 23, the relay node 300 is handed over from Cell_0-2 belonging to the donor base station $100_1$ to Cell_1-5 belonging to the donor base station $100_2$.

The neighbour cell list corresponding to Cell_0-2 belonging to the donor base station $100_1$ at the handover source, i.e., on the source side, includes the following information.

Hereinafter, "Self DeNB" designates the donor base station $100_1$; "DeNB#1" designates the donor base station $100_2$; "eNB#0" designates the base station $200_1$; "eNB#1" designates the base station $200_2$; and "Relay" designates the relay node 300.

List Name DeNB#0_Ncell_list#0-2
Cell Indicate: Cell_0-2
Self DeNB Ncell: Cell_0-0, Cell_0-1, Cell_0-3, Cell_0-4, Cell_0-5
DeNB#1 Ncell: Cell_1-0, Cell_1-4, Cell_1-5
eNB#0 Ncell: Cell_e0-0, Cell_e0-1
eNB#1 Ncell: Cell_e1-3, Cell_e1-4
Relay Ncell: Cell_r0

The neighbour cell list corresponding to Cell_0-5 belonging to the donor base station $100_2$ at the handover destination, i.e., on the target side, includes the following information.

Hereinafter, "Self DeNB" designates the donor base station $100_2$; "DeNB#0" designates the donor base station $100_1$; "eNB#0" designates the base station $200_1$; "eNB#1" designates the base station $200_2$; and "Relay" designates the relay node 300.

List Name DeNB#1 Ncell_list#1-5
Cell Indicate: Cell_1-5
Self DeNB Ncell: Cell_1-0, Cell_1-1, Cell_1-2, Cell_1-3, Cell_1-4
DeNB#0 Ncell: Cell_0-1, Cell_0-2, Cell_0-3
eNB#0 Ncell: Cell_e0-0, Cell_e0-1
eNB#1 Ncell: Cell_e1-3, Cell_e1-4
Relay Ncell: Cell_r0

FIG. 24 illustrates an exemplary operation of the wireless communication system. Referring to FIG. 24, the relay node 300 is handed over from Cell_0-2 belonging to the donor base station $100_1$ to Cell_1-5 belonging to the donor base station $100_2$.

A process of handing the relay node 300 over from the donor base station $100_1$ to the donor base station $100_2$ is started in step S2402. Said differently, a process of handing the relay node 300 over between the CPU 1062 of the donor base station $100_1$ and the CPU 1062 of the donor base station $100_2$ is started. Said differently, a process of handing the relay node 300 over between the CPU 1070 of the donor base station $100_1$ and the CPU 1070 of the donor base station $100_2$ is started.

The donor base station $100_1$ recognizes that the handover destination of the relay node 300 is the donor base station $100_2$ in step S2404. Said differently, the CPU 1062 of the donor base station $100_1$ recognizes that the handover destination of the relay node 300 is the donor base station $100_2$.

The donor base station $100_1$ reports the neighbour cell list corresponding to Cell_0-2 belonging to the donor base station $100_1$ to the donor base station $100_2$ in step S2406. Said differently, the CPU 1062 of the donor base station $100_1$ reports the neighbour cell list corresponding to Cell_0-2 belonging to the donor base station $100_1$ to the donor base station $100_2$. The neighbour cell list corresponding to Cell_0-2 is input in the transmission line interface 102 via the L2SW 104. The transmission line interface 102 reports the neighbour cell list corresponding to Cell_0-2 to the donor base station $100_2$.

The donor base station $100_2$ recognizes that the handover source of the relay node 300 is the donor base station $100_1$ in step S2408. Said differently, the CPU 1062 of the donor base station $100_2$ recognizes that the handover source of the relay node 300 is the donor base station $100_1$.

The donor base station $100_2$ reports the neighbour cell list corresponding to Cell_1-5 belonging to the donor base station $100_2$ to the donor base station $100_1$ in step S2410. Said differently, the CPU 1062 of the donor base station $100_2$ reports the neighbour cell list corresponding to Cell_1-5 belonging to the donor base station $100_2$ to the donor base station $100_1$. The neighbour cell list corresponding to Cell_1-5 is input into the transmission line interface 102 via the L2SW 104. The transmission line interface 102 reports the neighbour cell list corresponding to Cell_1-5 to the donor base station $100_1$.

The donor base station $100_1$ extracts information indicative of a non-overlapping cell by comparing information of the cell contained in the neighbour cell list corresponding to Cell_0-2 belonging to the donor base station $100_1$ with information of the cell contained in the neighbour cell list reported in step S2410 from the donor base station $100_2$ in step S2412. Said differently, the CPU 1062 of the donor base station $100_1$ extracts information indicative of the non-overlapping cell by comparing the information of the cell contained in the neighbour cell list corresponding to Cell_0-2 belonging to the donor base station $100_1$ with the information of the cell contained in the neighbour cell list reported from the donor base station $100_2$ in step S2410. Here, Cell_1-5 at the handover destination may be removed from the information indicative of the non-overlapping cell.

The donor base station $100_2$ extracts information indicative of the non-overlapping cell by comparing information of the cell contained in the neighbour cell list corresponding to Cell_1-5 belonging to the donor base station $100_2$ with information of the cell contained in the neighbour cell list reported in step S2406 from the donor base station $100_1$ in step S2414. Said differently, the CPU 1062 of the donor base station $100_2$ extracts information indicative of the non-overlapping cell by comparing the information of the cell contained in the neighbour cell list corresponding to Cell_1-5 belonging to the donor base station $100_2$ with the information of the cell contained in the neighbour cell list reported in step S2306 from the donor base station $100_1$. Here, Cell_0-2 at the handover source may be removed from the information indicative of the non-overlapping cell.

The donor base station $100_1$ instructs the donor base stations $100_1$ and $100_2$ and the base stations $200_1$ and $200_2$ accommodating the cell extracted as the non-overlapping cell in step S2412 to delete the cell belonging to the relay node 300 from the neighbour cell lists in step S2416. Said differently, the CPU 1062 of the donor base station $100_1$ instructs the donor base stations $100_1$ and $100_2$ and the base stations $200_1$ and $200_2$ accommodating the cell extracted as the non-overlapping cell in step S2412 to delete the cell belonging to the relay node 300 from the neighbour cell lists. At this time, since the cell at the handover destination is omitted, the cell at the handover destination is not deleted. Referring to FIG. 23, because there is not a non-overlapping cell in the donor base station $100_2$ and the base stations $200_1$ and $200_2$, the neighbour cell list update information in which "0" is designated as the "deleting neighbour cell number" is sent to the donor base station $100_2$ and the base stations $200_1$ and $200_2$.

In conformity with the instruction of step S2416, the donor base station $100_2$ and the base stations $200_1$ and $200_2$ update the neighbour cell lists in steps S2418, S2420 and S2422. Said differently, in conformity with the instruction in step S2416, the CPU 2062 of the base station $200_1$, the CPU 1062 of the donor base station $100_2$ and the CPU 2062 of the base station $200_2$ update their neighbour cell lists.

Further, it is instructed to the donor base station $100_1$ to delete the cell belonging to the relay node 300 from the neighbour cell lists corresponding to Cell_0-0, Cell_0-4 and Cell_0-5, which belong to the donor base station $100_1$ in step S2424. Said differently, the CPU 1062 of the donor base station $100_1$ deletes the cell belonging to the relay node 300 from the neighbour cell lists corresponding to Cell_0-0, Cell_0-4 and Cell_0-5, which belong to the donor base station $100_1$ in step S2424. This is because Cell_0-0, Cell_0-4 and Cell_0-5 do not overlap in the donor base station $100_1$.

The donor base station $100_2$ instructs the donor base stations $100_1$ and $100_2$ and the base stations $200_1$ and $200_2$ accommodating the cell extracted as the non-overlapping cell in step S2414 to add the cell belonging to the relay node 300 to the neighbour cell lists in step S2426. Said differently, the CPU 1062 of the donor base station $100_1$ instructs the donor base stations $100_1$ and $100_2$ and the base stations $200_1$ and $200_2$ accommodating the cell extracted as the non-overlapping cell in step S2412 to add the cell belonging to the relay node 300 to the neighbour cell lists. At this time, since the cell at the handover source is omitted, the cell at the handover source is not deleted. Referring to FIG. 23, because there isn't a non-overlapping cell in the donor base station $100_2$ and the base stations $200_1$ and $200_2$, the neighbour cell list update information in which "0" is designated as the "adding neighbour cell number" is sent to the donor base station $100_2$ and the base stations $200_1$ and $200_2$.

In conformity with the instruction of step S2426, the donor base station $100_1$ and the base stations $200_1$ and $200_2$ update the neighbour cell lists in steps S2428, S2430 and S2432. Said differently, in conformity with the instruction in step S2426, the CPU 2062 of the base station $200_1$, the CPU 1062 of the donor base station $100_1$ and the CPU 2062 of the base station $200_2$ update the neighbour cell lists.

The donor base station $100_2$ adds the cell belonging to the relay node 300 to the neighbour cell lists corresponding to Cell_1-1, Cell_1-2 and Cell_1-3, which belong to the donor base station $100_2$ in step S2434. Said differently, the CPU 1062 of the donor base station $100_2$ adds the cell belonging to the relay node 300 to the neighbour cell lists corresponding to Cell_1-1, Cell_1-2 and Cell_1-3, which belong to the donor base station $100_2$. This is because Cell_1-1, Cell_1-2 and Cell_1-3 do not overlap in the donor base station $100_1$.

After the processes of step S2434 are completed, the processes described in the first embodiment are performed.

<Second Operation of Wireless Communication System>

Referring to FIG. 23, the relay node 300 to which the relay cell 350 belongs is handed over from Cell_0-1 belonging to the donor base station $100_1$ to Cell_1-5 belonging to the donor base station $100_2$.

The neighbour cell list corresponding to Cell_0-1 belonging to the donor base station $100_1$ at the handover source, i.e., on the source side, includes the following information.

"Self DeNB" designates the donor base station $100_1$, "DeNB#1" designates the donor base station $100_2$, "eNB#1" designates the base station $200_2$ and "Relay" designates the relay node 300.

List Name DeNB#0_Ncell_list#0-1
Cell Indicate: Cell_0-1
Self DeNB Ncell: Cell_0-0, Cell_0-2, Cell_0-3, Cell_0-4, Cell_0-5
DeNB#1 Ncell: Cell_1-0, Cell_1-5
eNB#1 Ncell: Cell_e1-3, Cell_e1-4, Cell_e1-5
Relay Ncell: Cell_r0

The neighbour cell list corresponding to Cell_0-5 belonging to the donor base station $100_2$ at the handover destination, i.e., on the target side, includes the following information.

Hereinafter, "Self DeNB" designates the donor base station $100_2$; "DeNB#0" designates the donor base station $100_1$; "eNB#0" designates the base station $200_1$; "eNB#1" designates the base station $200_2$; and "Relay" designates the relay node 300.

List Name DeNB#1 Ncell_list#1-5
Cell Indicate: Cell_1-5
Self DeNB Ncell: Cell_1-0, Cell_1-1, Cell_1-2, Cell_1-3, Cell_1-4
DeNB#0 Ncell: Cell_0-1, Cell_0-2, Cell_0-3
eNB#0 Ncell: Cell_e0-0, Cell_e0-1
eNB#1 Ncell: Cell_e1-3, Cell_e1-4
Relay Ncell: Cell_r0

FIG. 25 illustrates an exemplary operation of the wireless communication system. Referring to FIG. 25, the relay node 300 is handed over from Cell_0-1 belonging to the donor base station $100_1$ to Cell_1-5 belonging to the donor base station $100_2$.

A process of handing the relay node 300 over from the donor base station $100_1$ to the donor base station $100_2$ is started in step S2502. Said differently, a process of handing the relay node 300 over from the CPU 1062 of the donor base station $100_1$ to the CPU 1062 of the donor base station $100_2$ is started. Said differently, a process of handing the relay node 300 over between the CPU 1070 of the donor base station $100_1$ and the CPU 1070 of the donor base station $100_2$ is started.

The donor base station $100_1$ recognizes that the handover destination of the relay node 300 is the donor base station $100_2$ in step S2504. Said differently, the CPU 1062 of the donor base station $100_1$ recognizes that the handover destination of the relay node 300 is the donor base station $100_2$.

The donor base station $100_1$ reports the neighbour cell list corresponding to Cell_0-1 belonging to the donor base station $100_1$ to the donor base station $100_2$ in step S2506. Said differently, the CPU 1062 of the donor base station $100_1$ reports the neighbour cell list corresponding to Cell_0-1 belonging to the donor base station $100_1$ to the donor base station $100_2$. The neighbour cell list corresponding to Cell_0-1 is input into the transmission line interface 102 via the L2SW 104. The transmission line interface 102 reports the neighbour cell list corresponding to Cell_0-1 to the donor base station $100_2$.

The donor base station $100_2$ recognizes that the handover source of the relay node 300 is the donor base station $100_1$ in step S2508. Said differently, the CPU 1062 of the donor base station $100_2$ recognizes that the handover source of the relay node 300 is the donor base station $100_1$.

The donor base station $100_2$ reports the neighbour cell list corresponding to Cell_1-5 belonging to the donor base station $100_2$ to the donor base station $100_1$ in step S2510. Said differently, the CPU 1062 of the donor base station $100_2$ reports the neighbour cell list corresponding to Cell_1-5 belonging to the donor base station $100_2$ to the donor base station $100_1$. The neighbour cell list corresponding to Cell_1-5 is input into the transmission line interface 102 via the L2SW 104. The transmission line interface 102 reports the neighbour cell list corresponding to Cell_1-5 to the donor base station $100_1$.

The donor base station $100_1$ extracts information indicative of a non-overlapping cell by comparing information of the cell contained in the neighbour cell list corresponding to Cell_0-1 belonging to the donor base station $100_1$ with information of the cell contained in the neighbour cell list reported in step S2510 from the donor base station $100_2$ in step S2512. Said differently, the CPU 1062 of the donor base station $100_1$ extracts the information indicative of the non-overlapping cell by comparing the information of the cell contained in the neighbour cell list corresponding to Cell_0-1 belonging to the donor base station $100_1$ with the information of the cell contained in the neighbour cell list reported from the donor base station $100_2$. Here, Cell_1-5 at the handover destination may be removed from the information indicative of the non-overlapping cell.

The donor base station $100_2$ extracts information indicative of the non-overlapping cell by comparing the information of the cell contained in the neighbour cell list corresponding to Cell_1-5 belonging to the donor base station $100_2$ with the information of the cell contained in the neighbour cell list reported in step S2506 from the donor base station $100_1$ in step S2514. Said differently, the CPU 1062 of the donor base station $100_2$ extracts information indicative of the non-overlapping cell by comparing the information of the cell contained in the neighbour cell list corresponding to Cell_1-5 belonging to the donor base station $100_2$ with the information of the cell contained in the neighbour cell list reported in step S2506 from the donor base station $100_1$. Here, Cell_0-1 at the handover source may be removed from the information indicative of the non-overlapping cell.

The donor base station $100_1$ instructs the donor base station $100_2$ and the base stations $200_1$ and $200_2$ accommodating the cell extracted as the non-overlapping cell in step S2512 to delete the cell belonging to the relay node 300 from the neighbour cell list in step S2516. Said differently, the CPU 1062 of the donor base station $100_1$ instructs the donor base station $100_1$ and the base stations $200_1$ and $200_2$ accommodating the cell extracted as the non-overlapping cell in step S2512 to delete the cell belonging to the relay node 300 from the neighbour cell lists. At this time, since the cell at the handover destination is omitted, the cell at the handover destination is not deleted. Referring to FIG. 23, because there isn't the non-overlapping cell in the donor base station $100_2$, the neighbour cell list update information in which "0" is designated as the "deleting neighbour cell number" is sent to the donor base station $100_2$. Because Cell_e1-5 does not overlap for the base station $100_2$, neighbour cell list update information where "1" is designated as the "deleting neighbour cell number" and "Cell_e1-5" is designated as the "neighbour cell information" is sent to the base station $100_2$.

In conformity with the instruction of step S2516, the donor base station $100_2$ and the base station $200_2$ update the neighbour cell lists in steps S2518 and S2520. Said differently, in conformity with the instruction in step S2516, the CPU 1062 of the base station $100_2$ and the CPU 2062 of the base station $200_2$ update the neighbour cell lists.

Further, it is instructed to the donor base station $100_1$ to delete the cell belonging to the relay node 300 from the neighbour cell lists corresponding to Cell_0-0, Cell_0-4 and Cell_0-5, which belong to the donor base station $100_1$ in step S2522. Said differently, the CPU 1062 of the donor base station $100_1$ deletes the cell belonging to the relay node 300 from the neighbour cell lists corresponding to Cell_0-0, Cell_0-4 and Cell_0-5, which belong to the donor base station $100_1$. This is because Cell_0-0, Cell_0-4 and Cell_0-5 do not overlap in the donor base station $100_1$.

The donor base station $100_2$ instructs the donor base stations $100_1$ and $100_2$ and the base stations $200_1$ and $200_2$ accommodating the cell extracted as the non-overlapping cell in step S2514 to add the cell belonging to the relay node 300 to the neighbour cell lists in step S2524. Said differently, the CPU 1062 of the donor base station $100_2$ instructs the donor base stations $100_1$ and $100_2$ and the base stations $200_1$ and $200_2$ accommodating the cell extracted as the non-overlapping cell in step S2514 to add the cell belonging to the relay node 300 to the neighbour cell lists. At this time, since the cell at the handover source is omitted, the cell at the handover source is not deleted. Referring to FIG. 23, because there isn't the non-overlapping cell in the donor base station $100_1$ and the base station $200_2$, the neighbour cell list update information in which "0" is designated as the "adding neighbour cell number" is sent to the donor base station $100_1$ and the base station $200_1$. Because Cell_e0-0 and Cell_e0-1 do not overlap for the base station $100_1$, neighbour cell list update information where "2" is designated as the "adding neighbour cell number" and "Cell_e0-0" and "Cell_e0-1" are designated as the "neighbour cell list update information" is sent to the base station $100_1$.

In conformity with the instruction of step S2524, the donor base station $100_1$ and the base stations $200_1$ and $200_2$ update the neighbour cell lists in steps S2526, S2528 and S2530. Said differently, in conformity with the instruction in step S2524, the CPU 2062 of the base station $200_1$, the CPU 1062 of the donor base station $100_1$ and the CPU 2062 of the base station $200_2$ update the neighbour cell lists.

The donor base station $100_2$ adds the cell belonging to the relay node 300 to the neighbour cell lists corresponding to Cell_1-1, Cell_1-2 Cell_1-3 and Cell_1-4, which belong to the donor base station $100_2$ in step S2532. Said differently, the CPU 1062 of the donor base station $100_2$ adds the cell belonging to the relay node 300 to the neighbour cell lists corresponding to Cell_1-1, Cell_1-2, Cell_1-3 and Cell_1-4, which belong to the donor base station $100_2$. This is because Cell_1-1, Cell_1-2, Cell_1-3 and Cell_1-4 do not overlap in the donor base station $100_2$.

After the processes of step S2532 are completed, the processes described in the first embodiment are performed.

According to the second embodiment, it is possible to make the cell adjacent to the cell at the handover source of the relay node and also adjacent to the cell at the handover destination of the relay node know at least a donor base station including a cell probably to be the cell adjacent to the cell belonging to the relay node or a base station including a cell probably to be adjacent to the cell belonging to the relay node.

Further, at least one of the donor base stations including the cell probably to be the neighbour cell of the cell belonging to the relay node or the base station including the cell probably to be the neighbour cell of the cell belonging to the relay node can optimize the neighbour cell list used for the handover of the relay node. Specifically, because it is possible to compare the information indicative of the cell contained in the neighbour cell list corresponding to the cell at the handover source with the information indicative of the cell contained in the neighbour cell list corresponding to the cell at the handover destination, the overlapping cell can be detected. Therefore, it is possible to efficiently update the neighbour cell list used for handing over the relay node.

Within the embodiments, the neighbour cell list including the cell probably to be the neighbour cell of the cell belonging to the relay node when the relay node hands over can be optimized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station communicating with a relay node, the base station comprising:
    a memory that stores a program; and
    a processor that executes the program and is thereby configured to
        when the relay node is handed over from a first source cell belonging to a first base station to a first destination cell belonging to the base station, request the relay node to measure wireless quality of neighbour cells adjacent to the first destination cell and report a measurement result of the wireless quality;
        when the measurement result of the wireless quality of a first neighbour cell among the neighbour cells is greater than or equal to a predetermined threshold, add a relay node cell of the relay node to a first neighbour cell list of the first neighbour cell; and
        when the measurement result of the wireless quality of a second neighbour cell among the neighbour cells is lower than the predetermined threshold, delete the relay node cell from a second neighbour cell list of the second neighbour cell,
    wherein when the relay node is handed over from a second source cell belonging to the base station to a second destination cell belonging to a second base station, the processor is configured to
        extract non-overlapping cells including first and second non-overlapping cells that exist in a source neighbour cell list of the second source cell but do not exist in a destination neighbour cell list of the second destination cell,
        request a third base station, to which the first non-overlapping cell belongs, to delete the relay node cell from a neighbour cell list of the first non-overlapping cell, and
        delete the relay node cell from a neighbour cell list of the second non-overlapping cell that belongs to the base station.

2. The base station according to claim 1,
    wherein when a third neighbour cell among the neighbour cells belongs to a fourth base station, the processor requests the fourth base station to update a third neighbour cell list of the third neighbour cell based on the measurement result of the wireless quality of the third neighbour cell.

3. The base station according to claim 2,
    wherein the processor sends, to the fourth base station, one of
        a signal requesting to add the relay node cell to the third neighbour cell list, and a signal requesting to delete the relay node cell from the third neighbour cell list.

4. The base station according to claim 2, further comprising:
a transmission line interface configured to send a request signal for requesting the fourth base station to update the third neighbour cell list.

5. The base station according to claim 1, further comprising:
a base station wireless interface configured to send a request signal for requesting the relay node to measure the wireless quality of the neighbour cells listed in a neighbour cell list of the first destination cell.

6. The base station according to claim 1,
wherein when the relay node is handed over from the first source cell belonging to the first base station to the first destination cell belonging to the base station, the processor is configured to
extract non-overlapping cells including third and fourth non-overlapping cells that exist in a destination neighbour cell list of the first destination cell but do not exist in a source neighbour cell list of the first source cell,
add the relay node cell to a neighbour cell list of the third non-overlapping cell that belongs to the base station, and
request a fourth base station, to which the fourth non-overlapping cell belongs, to add the relay node cell to a neighbour cell list of the fourth non-overlapping cell.

7. The base station according to claim 6,
wherein the processor requests the fourth base station to add the relay node cell to the neighbour cell list of the fourth non-overlapping cell via an X2 interface.

8. The base station according to claim 6, wherein
the base station adds the relay node cell to the neighbour cell list of the third non-overlapping cell based on a request signal received from the first base station.

9. The base station according to claim 6,
wherein the processor excludes the first source cell from the non-overlapping cells.

10. The base station according to claim 6, further comprising:
a transmission line interface configured to report, to the first base station, the destination neighbour cell list of the first destination cell.

11. The base station according to claim 1,
wherein the processor requests the third base station to delete the relay node cell from the neighbour cell list of the first non-overlapping cell via an X2 interface.

12. The base station according to claim 1,
wherein the processor excludes the second destination cell from the non-overlapping cells.

13. The base station according to claim 1, further comprising:
a transmission line interface configured to report, to the second base station, the source neighbour cell list of the second source cell.

14. A communication method performed by a base station communicating with a relay node, the communication method comprising:
when the relay node is handed over from a first source cell belonging to a first base station to a first destination cell belonging to the base station, requesting the relay node to measure wireless quality of neighbour cells adjacent to the first destination cell and report a measurement result of the wireless quality;
when the measurement result of the wireless quality of a first neighbour cell among the neighbour cells is greater than or equal to a predetermined threshold, adding a relay node cell of the relay node to a first neighbour cell list of the first neighbour cell;
when the measurement result of the wireless quality of a second neighbour cell among the neighbour cells is lower than the predetermined threshold, deleting the relay node cell from a second neighbour cell list of the second neighbour cell;
when the relay node is handed over from a second source cell belonging to the base station to a second destination cell belonging to a second base station, extracting non-overlapping cells including first and second non-overlapping cells that exist in a source neighbour cell list of the second source cell but do not exist in a destination neighbour cell list of the second destination cell;
requesting a third base station, to which the first non-overlapping cell belongs, to delete the relay node cell from a neighbour cell list of the first non-overlapping cell; and
deleting the relay node cell from a neighbour cell list of the second non-overlapping cell that belongs to the base station.

15. A wireless communication system comprising
a relay node; and
a base station that communicates with the relay node,
wherein the base station is configured to
when the relay node is handed over from a first source cell belonging to a first base station to a first destination cell belonging to the base station, request the relay node to measure wireless quality of neighbour cells adjacent to the first destination cell and report a measurement result of the wireless quality;
when the measurement result of the wireless quality of a first neighbour cell among the neighbour cells is greater than or equal to a predetermined threshold, add a relay node cell of the relay node to a first neighbour cell list of the first neighbour cell; and
when the measurement result of the wireless quality of a second neighbour cell among the neighbour cells is lower than the predetermined threshold, delete the relay node cell from a second neighbour cell list of the second neighbour cell,
wherein when the relay node is handed over from a second source cell belonging to the base station to a second destination cell belonging to a second base station, the base station is configured to
extract non-overlapping cells including first and second non-overlapping cells that exist in a first source neighbour cell list of the second source cell but do not exist in a destination neighbour cell list of the second destination cell,
request a third base station, to which the first non-overlapping cell belongs, to delete the relay node cell from a neighbour cell list of the first non-overlapping cell, and
delete the relay node cell from a neighbour cell list of the second non-overlapping cell that belongs to the base station; and
wherein when the relay node is handed over from the first source cell belonging to the first base station to the first destination cell belonging to the base station, the base station is configured to
extract non-overlapping cells including third and fourth non-overlapping cells that exist in a destination neighbour cell list of the first destination cell but do not exist in a source neighbour cell list of the first source cell, add the relay node cell to a neighbour cell list of the third non-overlapping cell that belongs to the base station, and request a fourth base station, to which the fourth non-overlapping cell belongs, to add the relay node cell to a neighbour cell list of the fourth non-overlapping cell.

\* \* \* \* \*